(12) United States Patent
Dai et al.

(10) Patent No.: US 8,574,534 B2
(45) Date of Patent: Nov. 5, 2013

(54) CARBON FILMS PRODUCED FROM IONIC LIQUID CARBON PRECURSORS

(75) Inventors: Sheng Dai, Knoxville, TN (US); Huimin Luo, Knoxville, TN (US); Je Seung Lee, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 659 days.

(21) Appl. No.: 12/726,548

(22) Filed: Mar. 18, 2010

(65) Prior Publication Data

US 2011/0229401 A1    Sep. 22, 2011

(51) Int. Cl.
| | | |
|---|---|---|
| *C01B 31/00* | (2006.01) | |
| *C01G 1/00* | (2006.01) | |
| *C07C 255/00* | (2006.01) | |
| *H01M 4/13* | (2010.01) | |
| *H01M 6/14* | (2006.01) | |
| *H01M 6/18* | (2006.01) | |
| *H01M 8/10* | (2006.01) | |
| *H01M 4/02* | (2006.01) | |
| *B05D 5/12* | (2006.01) | |

(52) U.S. Cl.
USPC ............... 423/445 R; 423/594.1; 558/303; 429/231.8; 429/303; 429/307; 429/479; 429/209; 427/58; 427/80; 427/115

(58) Field of Classification Search
None
See application file for complete search history.

(56) References Cited

U.S. PATENT DOCUMENTS

| | | | |
|---|---|---|---|
| 7,479,353 B2 | 1/2009 | Hollenkamp et al. | |
| 2001/0051125 A1* | 12/2001 | Watanabe et al. | ......... 423/445 R |
| 2011/0150736 A1* | 6/2011 | Hagiwara et al. | ............ 423/276 |

OTHER PUBLICATIONS

Baker et al.; Facile Ionothermal Synthesis of Microporous and Mesoporous Carbons from Taken Specific Ionic Liquids; J. Am. Che. Soc.; 131, 4596-4597; Mar. 18, 2009.*

Xuehui L. et al., "Applications of Functionalized Ionic Liquids", *Science in China Series B: Chemistry* 49(5):385-401 (2006).

Zhao D. et al., "Nitrile-Functionalized Pyridinium Ionic Liquids: Synthesis, Characterization, and Their Application in Carbon-Carbon Coupling Reactions", *J. Am. Chem. Soc.* 126(48):15876-15882 (2004).

Kuhn P. et al., "From Microporous Regular Frameworks to Mesoporous Materials With Ultrahigh Surfaces Area: Dynamic Reorganization of Porous Polymer Networks", *J. Am. Chem. Soc.* 130(40):13333-13337 (2008).

Lee J.S. et al., "Facile Ionothermal Synthesis of Microporous and Mesoporous Carbons from Task Specific Ionic Liquids", *J. Am. Chem. Soc.* 131(13):4596-4597 (2009).

Bonhôte P. et al., "Hydrophobic, Highly Conductive Ambient-Temperature Molten Salts", *Inorganic Chemistry* 35(5):1168-1178 (1996).

(Continued)

*Primary Examiner* — Guinever Gergorio
(74) *Attorney, Agent, or Firm* — Scully, Scott, Murphy & Presser, P.C.

(57) ABSTRACT

The invention is directed to a method for producing a film of porous carbon, the method comprising carbonizing a film of an ionic liquid, wherein the ionic liquid has the general formula $(X^{+a})_x(Y^{-b})_y$, wherein the variables a and b are, independently, non-zero integers, and the subscript variables x and y are, independently, non-zero integers, such that $a \cdot x = b \cdot y$, and at least one of $X^+$ and $Y^-$ possesses at least one carbon-nitrogen unsaturated bond. The invention is also directed to a composition comprising a porous carbon film possessing a nitrogen content of at least 10 atom %.

29 Claims, 15 Drawing Sheets

(56) References Cited

OTHER PUBLICATIONS

Singh R. et al., "Ionic Liquids: A Versatile Medium for Palladium-Catalyzed Reactions", *J. Braz. Chem. Soc.* 19(3):357-379 (2008).

Huang J-F. et al., "Hydrophobic Brønsted Acid-Base Ionic Liquids Based on PAMAM Dendrimers with High Proton Conductivity and Blue Photoluminescence", *J. Am. Chem. Soc.* 127(37):12784-12785 (2005).

Greaves T.L. et al., "Protic Ionic Liquids: Properties and Applications", *Chemical Revieivs* 108(1):206-237 (2008).

Kolomeitsev A.A. et al., "Guanidinophosphazenes: Design, Synthesis, and Basicity in THF and in the Gas Phase", *J. Am. Chem. Soc.* 127(50):17656-17666 (2005).

* cited by examiner

[HTBDH]NO₃

[MTBDH]NO₃

[MTBDH]H₂PO₄

[DMAcH]H₂PO₄

[MTBDH]Tf₂N

[MTBDH]BETI

[BMPyr]N(CN)₂

[TCNPA]Tf₂N

[BMIm]N(CN)₂

[BMIm]Tf₂N

[MPCNIm]N(CN)₂

[BCNIm]Cl

[BCNIm]H₂PO₄

[MCNIm]Cl

[BCNIm]Tf₂N

[BCNIm]BETI

[MCNIm]Tf₂N

CARBON FILMS PRODUCED FROM IONIC LIQUID CARBON PRECURSORS

This invention was made with government support under Contract Number DE-AC05-00OR22725 between the United States Department of Energy and UT-Battelle, LLC. The U.S. government has certain rights in this invention.

FIELD OF THE INVENTION

The present invention relates generally to the preparation of carbon films, and more particularly, to methods for producing porous thin films of carbon.

BACKGROUND OF THE INVENTION

Porous carbon materials are used in numerous applications, including for separation, catalysis, and energy storage (e.g., battery components). The synthesis typically involves the carbonization of either synthetic or natural polymer sources. Polymer carbon precursors have been favored primarily because of their low vapor pressures. The low vapor pressure of polymers results in high char formation along with a virtual absence in vaporization during carbonization.

However, the use of polymers in the carbonization process has several drawbacks. At least one significant problem in using polymers is their high viscosity, which makes polymers difficult to apply as a coating on a substrate in the production of carbon films. Often, the polymer is a solid. Accordingly, the highly viscous or solid polymer typically requires dissolution in a solvent in order to apply the polymer as a thin film on a substrate. However, in order for the carbonization process to produce a seamless continuous carbon film, a preceding solvent removal step (i.e., calcination) is required. Not only is the calcination step time-intensive, but the calcination step can, itself, introduce imperfections into the final carbon film.

Attempts have been made to circumvent the use of polymers by instead using non-polymer liquid molecules. Non-polymer liquid molecules can be applied in a facile manner as a coating on a substrate. However, non-polymer molecules have thus far been highly problematic mainly because of their high volatility, which results in low or no carbon yields.

SUMMARY OF THE INVENTION

The instant invention is directed to methods in which liquid molecular (i.e., non-polymeric) materials are used as carbon precursor materials. The invention advantageously overcomes the difficulties of using non-polymeric carbon precursors of the art by using ionic liquids as carbon precursors, and moreover, wherein the ionic liquids are required to contain at least one carbon-nitrogen unsaturated bond in either or both of the cationic and anionic portions of the ionic liquid. The ionic liquid can conveniently be expressed by the general formula $X^+Y^-$, wherein $X^+$ represents the cationic portion and $Y^-$ represents the anionic portion of the ionic liquid. In a particular embodiment, the method includes carbonizing a film of the ionic liquid to produce a film of porous carbon. In other aspects, the invention is directed to a porous carbon film composition produced by the inventive method.

The method described herein advantageously provides a method in which liquid non-polymer molecules are used as carbon precursors. The liquid non-polymer molecules used herein advantageously possess the low vapor pressures and high char capacities of polymers under typical carbonization conditions. Moreover, by the extensive crosslinking that occurs between carbon precursor molecules of the invention during heat processing, the method described herein is capable of producing porous carbon films having a significant degree of order (e.g., a highly ordered arrangement of pores and/or highly uniform pore size).

DETAILED DESCRIPTION OF THE INVENTION

Figure 1:
FIG. 1. Chemical structures of some exemplary ionic liquid carbon precursors of the invention, where BMIm=butylmethylimidazolium, BCNIm=bis(cyanomethyl)imidazolium, MCNIm=methylcyanomethylimidazolium, MPCNIm=methylcyanopropylimidazolium, BMPyr=butylmethylpyrrolidinium, TCNPA=tris(cyanomethyl)propylammonium, MTBDH=1,3,4,6,7,8-hexahydro-1-methyl-2H-pyrimido[1,2-a]pyrimidinium, HTBDH=1,3,4,6,7,8-hexahydro-2H-pyrimido[1,2-a]pyrimidinium, and DMAcH=dimethylacetamidium.
Figure 1:
Figure 1:
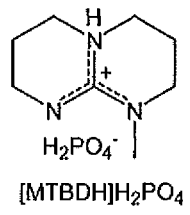
Figure 1:
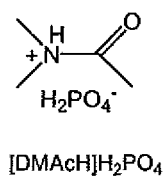
Figure 1:
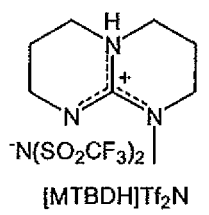
Figure 1:
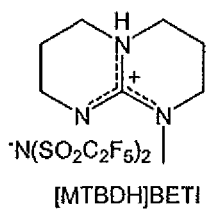
Figure 1:
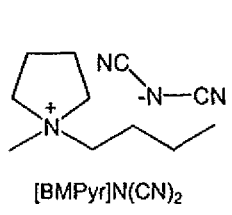
Figure 1:
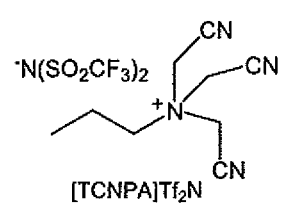
Figure 1:
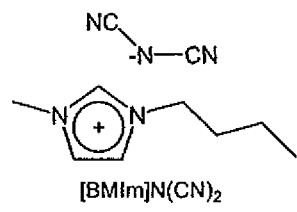
Figure 1:
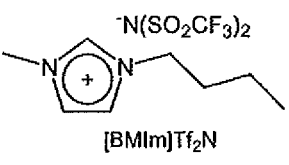
Figure 1:
Figure 1:
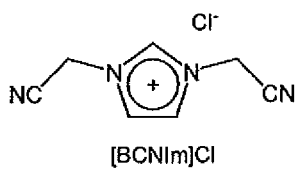
Figure 1:
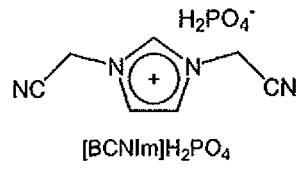
Figure 1:
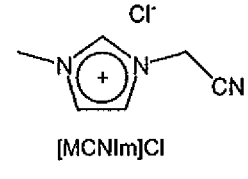
Figure 1:
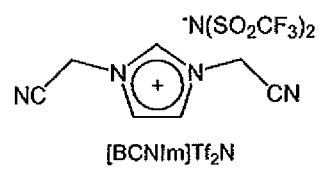
Figure 1:
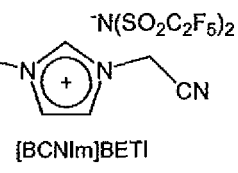
Figure 1:
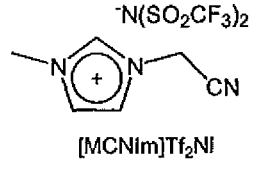

The terms "hydrocarbon group" and "hydrocarbon linker", as used herein, are, in a first embodiment, composed solely of carbon and hydrogen. In different embodiments, one or more of the hydrocarbon groups or linkers can contain precisely, or a minimum of, or a maximum of, for example, one, two, three, four, five, six, seven, eight, nine, ten, eleven, twelve, thirteen, fourteen, fifteen, sixteen, seventeen, or eighteen carbon atoms, or a particular range of carbon atoms between any of the foregoing carbon numbers. Hydrocarbon groups of different ionic liquid compounds described herein may possess the same or different number (or preferred range thereof) of carbon atoms in order to independently adjust or optimize one or more characteristics of each type of ionic liquid.

The hydrocarbon groups or linkers can be, for example, saturated and straight-chained (i.e., straight-chained alkyl groups or alkylene linkers). Some examples of straight-chained alkyl groups (or alkylene linkers) include methyl (or methylene, i.e., —$CH_2$—, or methine linkers), ethyl (or ethylene or dimethylene, i.e., —$CH_2CH_2$— linkers), n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, and n-octadecyl groups.

The hydrocarbon groups or linkers can alternatively be saturated and branched (i.e., branched alkyl groups or alkylene linkers). Some examples of branched alkyl groups include isopropyl, isobutyl, sec-butyl, t-butyl, isopentyl, neopentyl, 2-methylpentyl, 3-methylpentyl, and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ saturated and branched hydrocarbon groups. Some examples of branched alkylene linkers are those derived by removal of a hydrogen atom from one of the foregoing exemplary branched alkyl groups (e.g., isopropylene, —$CH(CH_3)CH_2$—).

The hydrocarbon groups or linkers can alternatively be saturated and cyclic (i.e., cycloalkyl groups or cycloalkylene linkers). Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicycle) group by either possessing a bond between two ring groups (e.g., dicyclohexyl) or a shared (i.e., fused) side (e.g., decalin and norbornane). Some examples of cycloalkylene linkers are those derived by removal of a hydrogen atom from one of the foregoing exemplary cycloalkyl groups.

The hydrocarbon groups or linkers can alternatively be unsaturated and straight-chained (i.e., straight-chained olefinic or alkenyl groups or linkers). The unsaturation occurs by the presence of one or more carbon-carbon double bonds and/or one or more carbon-carbon triple bonds. Some examples of straight-chained olefinic groups include vinyl, 2-propen-1-yl (allyl), 3-buten-1-yl, 2-buten-1-yl, butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl (2-propynyl), and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and straight-chained hydrocarbon groups. Some examples of straight-chained olefinic linkers are those derived by removal of a hydrogen atom from one of the foregoing exemplary straight-chained olefinic groups (e.g., vinylene, —CH=CH—, or vinylidene).

The hydrocarbon groups or linkers can alternatively be unsaturated and branched (i.e., branched olefinic or alkenyl groups or linkers). Some examples of branched olefinic groups include 2-propen-2-yl, 3-buten-2-yl, 3-buten-3-yl, 4-penten-2-yl, 4-penten-3-yl, 3-penten-2-yl, 3-penten-3-yl, 2,4-pentadien-3-yl, and the numerous $C_6$, $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and branched hydrocarbon groups. Some examples of branched olefinic linkers are those derived by removal of a hydrogen atom from one of the foregoing exemplary branched olefinic groups.

The hydrocarbon groups or linkers can alternatively be unsaturated and cyclic (i.e., cycloalkenyl groups or cycloalkenylene linkers). Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic (e.g., bicyclic) group by either possessing a bond between two of the ring groups (e.g., biphenyl) or a shared (i.e., fused) side (e.g., naphthalene, anthracene, phenanthrene, phenalene, and indene). Some examples of cycloalkenylene linkers are those derived by removal of a hydrogen atom from one of the foregoing exemplary cycloalkenyl groups (e.g., phenylene and biphenylene).

One or more of the hydrocarbon groups or linkers may also include one or more heteroatoms (i.e., non-carbon and non-hydrogen atoms), such as one or more heteroatoms selected from oxygen, nitrogen, sulfur, halide, and phosphorus atoms. Some examples of oxygen-containing groups include hydroxyl (OH) groups, carbonyl groups (e.g., ketone, aldehyde, ester, amide, or urea functionalities), and carbon-oxygen-carbon (ether) groups. The ether group can also be a polyalkyleneoxide group, such as a polyethyleneoxide group. Some examples of nitrogen-containing groups include primary amine groups, secondary amine groups, tertiary amine groups, quaternary amine groups, nitrite (cyanide) group, amide group (i.e., —$C(O)NR_2$, wherein R is independently selected from hydrogen atom and hydrocarbon group, as described above), nitro group, urea group, imino group, and carbamate group, wherein it is understood that a quaternary amine group necessarily possesses a positive charge and requires a counteranion. Some examples of sulfur-containing groups include mercapto (i.e., —SH), thioether (i.e., sulfide), disulfide, sulfoxide, sulfone, sulfonate, and sulfate groups. Some examples of halogen atoms considered herein include fluorine, chlorine, and bromine. Some examples of fluorine-containing hydrocarbon groups (i.e., fluorocarbon groups) include the partially-substituted varieties (e.g., fluoromethyl, difluoromethyl, 2-fluoroethyl, 2,2-difluoroethyl, 2,2,2-trifluoroethyl, fluorobenzene, fluorobenzyl, and the like) and perfluoro-substituted varieties (e.g., perfluoromethyl, perfluoroethyl, perfluoropropyl, perfluorobutyl, pentafluorophenyl, and the like). Some examples of phosphorus-containing groups include dialkylphosphine, dialkenylphosphine, arylphosphine, diarylphosphine, phosphinidene, phosphazene, phosphine oxide, phosphinite, phosphinate, phosphonite, phosphonate, phosphite, phosphate, and phosphonium groups.

Of the heteroatom groups described above, particular consideration is given to amino groups, such as described by the following formula:

$$-NR^{12}R^{13} \qquad (1)$$

In formula (4) above, $R^{12}$ and $R^{13}$ are each independently selected from a hydrogen atom and any of the hydrocarbon groups described above, including unsubstituted and heteroatom-substituted hydrocarbon groups. The hydrocarbon groups particularly considered herein for $R^{12}$ and $R^{13}$ contain at least one, two, or three carbon atoms and up to four, five, six, seven, or eight carbon atoms.

The groups $R^{12}$ and $R^{13}$ in formula (1) can, in one embodiment, be non-interconnected. Some examples of amino groups according to formula (1) in which $R^{12}$ and $R^{13}$ are non-interconnected include amino (—NH$_2$), methylamino (—N(H)CH$_3$), dimethylamino (dma), ethylamino, diethylamino, n-propylamino, di(n-propyl)amino, isopropylamino, diisopropylamino, n-butylamino, di(n-butyl)amino, isobutylamino, diisobutylamino, sec-butylamino, di(sec-butyl) amino, t-butylamino, di(t-butyl)amino, n-pentylamino, di(n-pentyl)amino, isopentylamino, diisopentylamino, neopentylamino, n-hexylamino, di(n-hexyl)amino, isohexylamino, n-heptylamino, n-octylamino, di(n-octyl)amino, isooctylamino, vinylamino, allylamino, diallylamino, cyclobutylamino, cyclopentylamino, cyclohexylamino, phenylamino, diphenylamino, benzylamino, dibenzylamino, hydroxymethylamino (HOCH$_2$NH—), di(hydroxymethyl) amino, methoxymethylamino, hydroxyethylamino, di(hydroxyethyl)amino, methoxyethylamino, ethoxyethylamino, 2-(hydroxy)ethoxymethylamino (HOCH$_2$CH$_2$OCH$_2$NH—), 2-[2-(hydroxy)ethoxy]ethylamino (HOCH$_2$CH$_2$OCH$_2$CH$_2$NH—), aminomethylamino (H$_2$NCH$_2$NH—), and 2-aminoethylamino (H$_2$NCH$_2$CH$_2$NH—) groups.

In another embodiment, the groups $R^{12}$ and $R^{13}$ in formula (1) are interconnected, thereby making the amino group of formula (1) an amino-containing ring group. Some examples of amino groups according to formula (1) in which $R^{12}$ and $R^{13}$ are interconnected include azacyclopropyl (aziridinyl or dimethyleneiminyl), azacyclobutyl (azetidinyl or trimethyleneiminyl), pyrrolidinyl, pyrrolyl, imidazolyl, imidazolidinyl, oxazolyl, pyrazolyl, piperidinyl, piperazinyl, morpholinyl, pyridinyl, pyrimidinyl, pyrazinyl, triazinyl, triazacyclohexyl, azacycloheptyl (homopiperidinyl), azacyclooctyl, indolyl, benzimidazolyl, purinyl, quinolinyl, decahydroquinolinyl, and bipyridyl groups.

The groups $R^{12}$ and $R^{13}$ in formula (1) can also together represent a double bond connecting the shown nitrogen atom to a carbon atom, with the result of forming an imino group, as represented by the following formula:

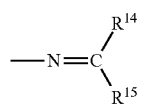

(1a)

In formula (1a), $R^{14}$ and $R^{15}$ can independently be selected from a hydrogen atom, any of the substituted or unsubstituted hydrocarbon groups described above bound to the shown C atom by a carbon atom, or an amino group (as depicted by formula (1)) bound to the shown C atom by its nitrogen atom. $R^{14}$ and $R^{15}$ can also be either non-interconnected or interconnected. In a first embodiment, both $R^{14}$ and $R^{15}$ are hydrogen atoms. In a second embodiment, $R^{14}$ is a hydrogen atom and $R^{15}$ is a hydrocarbon group. In a third embodiment, $R^{14}$ is a hydrogen atom and $R^{15}$ is an amino group. In a fourth embodiment, both of $R^{14}$ and $R^{15}$ are hydrocarbon groups. In a fifth embodiment, $R^{14}$ is a hydrocarbon group and $R^{15}$ is an amino group. In a sixth embodiment, both of $R^{14}$ and $R^{15}$ are amino groups. When $R^{14}$ and $R^{15}$ are both amino groups, formula (1a) represents a guanidino group. The guanidino group is an acyclic guanidino group when $R^{14}$ and $R^{15}$ are non-interconnected. The guanidino group is a cyclic guanidino group when $R^{14}$ and $R^{15}$ are interconnected. Some particular examples of cyclic guanidino groups include imidazolidin-2-ylideneamino, 1,3-dihydro-2H-imidazol-2-ylideneamino, and (1,3-dimethylimidazolidin-2-ylidene) amino.

The groups $R^{12}$ and $R^{13}$ in formula (1) can also together represent a double bond connecting the shown nitrogen atom to a phosphorus atom, with the result of forming a phosphazeno group, as represented by the following formula:

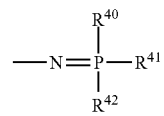

(1b)

In formula (1b), $R^{40}$, $R^{41}$ and $R^{42}$ can independently be selected from amino groups, as shown in formula (1), bound to the shown P atom by a nitrogen atom; and imino groups, as shown in formula (1a), bound to the shown P atom by a nitrogen atom; and any of the substituted or unsubstituted hydrocarbon groups described above bound to the shown P atom by a carbon atom. In a first embodiment, all of $R^{40}$, $R^{41}$ and $R^{42}$ are selected from any of the hydrocarbon groups described above. In a second embodiment, two of $R^{40}$, $R^{41}$ and $R^{42}$ are selected from hydrocarbon groups while one of $R^{40}$, $R^{41}$ and $R^{42}$ is an amino group or imino group. In a third embodiment, two of $R^{40}$, $R^{41}$ and $R^{42}$ are selected from any of the amino and/or imino groups described above, while one of $R^{40}$, $R^{41}$ and $R^{42}$ is a hydrocarbon group. In a fourth embodiment, all of $R^{40}$, $R^{41}$ and $R^{42}$ are selected from any of the amino and/or imino groups described above. In one embodiment, $R^{40}$, $R^{41}$ and $R^{42}$ are non-interconnected. In other embodiments, two or three of $R^{40}$, $R^{41}$ and $R^{42}$ are interconnected.

In formula (1b), one, two, or all of $R^{40}$, $R^{41}$ and $R^{42}$ can, themselves, also be phosphazeno groups as depicted in formula (1b). The foregoing three embodiments are encompassed by the following three subformulas of formula (1b):

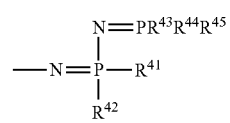

(1c)

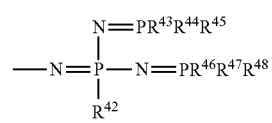

(1d)

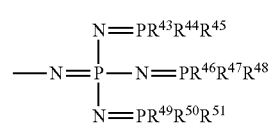

(1e)

In formulas (1c), (1d), and (1e), $R^{43}$, $R^{44}$, $R^{45}$, $R^{46}$, $R^{47}$, $R^{48}$, $R^{49}$, $R^{50}$, and $R^{51}$ are independently selected from unsubstituted or heteroatom-substituted hydrocarbon groups, and/or amino groups according to formula (1), and/or imino groups according to formula (1a), and/or phosphazeno groups according to formula (1 b).

The ionic liquid compositions used herein can be conveniently described by the formula $(X^+)(Y^-)$, wherein $X^+$ is a cationic component of the ionic liquid and $Y^-$ is an anionic component of the ionic liquid. The formula $(X^+)(Y^-)$ is meant to encompass a cationic component having any valency of positive charge, and an anionic component having any valency of negative charge, provided that the charge contributions from the cationic portion and anionic portion are counterbalanced in order for charge neutrality to be preserved in the ionic liquid molecule. More specifically, the formula $(X^+)(Y^-)$ is meant to encompass the more generic formula $(X^{+a})_x(Y^{-b})_y$, wherein the variables a and b are, independently, non-zero integers, and the subscript variables x and y are, independently, non-zero integers, such that $a \cdot x = b \cdot y$ (wherein the period placed between variables indicates multiplication of the variables). The foregoing generic formula encompasses numerous possible sub-formulas, such as, for example, $(X^+)(Y^-)$, $(X^{+2})(Y^-)_2$, $(X^+)_2(Y^{-2})$, $(X^{+2})_2(Y^{-2})_2$, $(X^{+3})(Y^-)_3$, $(X^+)_3(Y^{-3})$, $(X^{+3})_2(Y^{-2})_3$, and $(X^{+2})_3(Y^{-3})_2$.

The ionic liquids used in the instant invention possess at least one carbon-nitrogen (C—N) unsaturated bond in the cationic portion ($X^+$), or at least one C—N unsaturated bond in the anionic portion ($Y^-$), or at least one C—N unsaturated bond in each of $X^+$ and $Y^-$ of the ionic liquid. In one embodiment, the cationic portion does not contain a C—N unsaturated bond, while the anionic portion contains at least one C—N unsaturated bond. In another embodiment, the cationic portion contains at least one C—N unsaturated bond, while the anionic portion does not contain a C—N unsaturated bond. In another embodiment, both the cationic portion and the anionic portion each contain at least one C—N unsaturated bond. The C—N unsaturated bond can be, for example, an imino bond (i.e., C=N bond) or nitrile-containing group (e.g., —CN group, i.e., or "nitrite group" or "cyanide group", or a cyanate, isocyanate, or thiocyanate group).

In particular embodiments, the $X^+$ portion of the ionic liquid includes a group with at least one (e.g., one, two, three, or more) nitrogen atoms, wherein typically, at least one of the nitrogen atoms is positively charged. In one embodiment, the $X^+$ portion of the ionic liquid includes a nitrogen-containing ring. The nitrogen-containing ring can be, for example, saturated or unsaturated, and either monocyclic, bicyclic, or polycyclic (i.e., multiple rings fused or linked), and contain one, two, three, four, or larger number of nitrogen atoms. Some examples of nitrogen-containing rings include azacyclopropyl (aziridinyl or dimethyleneiminyl), azacyclobutyl (azetidinyl or trimethyleneiminyl), pyrrolidinyl, pyrrolyl, imidazolyl, imidazolidinyl, oxazolyl, pyrazolyl, piperidinyl, piperazinyl, morpholinyl, pyridinyl, pyrimidinyl, pyrazinyl, triazinyl, triazacyclohexyl, azacycloheptyl (homopiperidinyl), azacylooctyl, indolyl, benzimidazolyl, purinyl, quinolinyl, decahydroquinolinyl, and bipyridyl rings.

In a particular embodiment, $X^+$ of the ionic liquid includes an imidazolium ring. The imidazolium ring can be substituted at any one, two, three, four, or five of the positions of the ring, e.g., by one, two, three, four, or five hydrocarbon groups, heteroatom groups, and/or heteroatom-substituted hydrocarbon groups on any one, two, three, four or five of the 1, 2, 3, 4, and 5 positions of the imidazolium ring. The substituents may also be interconnected so as to form another ring fused or linked to the imidazolium ring. For example, the imidazolium ring may be fused to another ring, such as a benzene ring, thereby resulting in a benzimidazolium ring system.

Typically, the imidazolium ring possesses a positive charge by virtue of having one or both of the nitrogen atoms (i.e., the 1 and/or 3 positions) therein substituted by a hydrocarbon or heteroatom-substituted hydrocarbon group. However, it is contemplated herein that the imidazolium ring can possess a positive charge while the nitrogen atoms are not substituted (e.g., by substitution on the 2, 4, and/or 5 positions of the imidazolium ring by one or more groups bearing a positive charge, such as an ammonium- or phosphonium- or sulfonium-containing group). Furthermore, the imidazolium ring may possess greater than a single positive (+1) charge, e.g., by substitution of the nitrogen atoms and inclusion of one or more other groups bearing a positive charge.

In a particular embodiment, the imidazolium-containing ionic liquid has the structural formula:

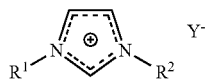

(2)

In formula (2), $R^1$ and $R^2$ are independently selected from hydrogen atom and any of the hydrocarbon groups described above, wherein the hydrocarbon group can be unsubstituted or optionally substituted with one or more heteroatoms and/or heteroatom groups, and $Y^-$ represents a counteranion. The dotted lines in formula (2) indicate the delocalization of double bonds, as known in the art to occur in imidazolium and other aromatic rings. In one set of embodiments, both of $R^1$ and $R^2$ are hydrogen atoms. In another set of embodiments, one of $R^1$ and $R^2$ is a hydrocarbon group while the other is a hydrogen atom. In another set of embodiments, both of $R^1$ and $R^2$ are, independently, hydrocarbon groups (wherein the hydrocarbon groups can optionally be heteroatom-substituted as described above). The hydrocarbon groups can contain any number of carbon atoms, as described above; however, in particular embodiments, $R^1$ and $R^2$ are independently selected from hydrocarbon groups possessing precisely, at least, or no more than 1, 2, 3, 4, 5, 6, 7, 8, 9, 10, 11, 12, 13, 14, 15, 16, 17, or 18 carbon atoms, or a number of carbon atoms within a range bounded by any two of these carbon numbers. In some embodiments, $R^1$ and $R^2$ are the same in structure, or carbon number, or type of hydrocarbon group. In other embodiments, $R^1$ and $R^2$ are different in structure, or carbon number, or type of hydrocarbon group.

The imidazolium ring possesses, by its very nature, a C—N unsaturated bond. Therefore, the imidazolium-containing ionic liquids are suitable herein as carbon precursors even if the imidazolium portion contains no further C—N unsaturated bonds or groups and if $Y^-$ contains no C—N unsaturated bond or group.

In one embodiment, the imidazolium ring contains one, two, three, or more additional C—N unsaturated bonds or groups while $Y^-$ contains no C—N unsaturated bonds or groups. In another embodiment, the imidazolium ring contains no additional C—N unsaturated bonds or groups while $Y^-$ contains one, two, three, or more C—N unsaturated bonds or groups. In yet another embodiment, the imidazolium ring contains one, two, three, or more additional C—N unsaturated bonds or groups while $Y^-$ also contains one, two, three, or more C—N unsaturated bonds or groups.

In a particular embodiment, the C—N unsaturated bond or group is a nitrile (CN) group. In a further embodiment, the nitrile group is part of a nitrile-containing hydrocarbon group, wherein typically, the nitrile-containing hydrocarbon group is bound by one of its non-nitrile carbon atoms to an atom (typically, a nitrogen atom) of the imidazolium ring, and/or to an atom of counteranion $Y^-$. The nitrile-containing hydrocarbon group can be, for example, cyclic or acyclic. If acyclic, the nitrile-containing hydrocarbon group can be, for example, straight-chained or branched. If cyclic, the nitrile-containing hydrocarbon group contains a nitrile group attached to a hydrocarbon ring which can be, for example, unsaturated (e.g., aromatic or unsaturated aliphatic), or saturated. The nitrile-containing hydrocarbon group may also contain one, two, or more additional carbon-carbon double and/or triple bonds (i.e., one or more unsaturated bonds) therein. The nitrile-containing hydrocarbon group may also contain one, two, or more additional heteroatoms or heteroatom groups, as described above. Each nitrile-containing hydrocarbon group may also contain more than one nitrile group (e.g., two, three, or more nitrile groups).

In a particular embodiment, the nitrile-containing hydrocarbon group is straight-chained and has the formula:

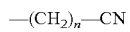

$$—(CH_2)_n—CN \quad (3)$$

In formula (3), n is an integer of at least 1. In different embodiments, n can be, for example, precisely, at least, or no more than 1, 2, 3, 4, 5, 6, 7, 8, 9, 10, 11, 12, 13, 14, 15, 16, 17, or 18, or within a range bounded by any two of these values.

Referring again to formula (2), in a particular embodiment thereof, $R^1$ and $R^2$ are independently selected from hydrogen atom, hydrocarbon group, and nitrile-containing hydrocarbon group, provided that at least one of $R^1$ and $R^2$ is a nitrile-containing hydrocarbon group. In one embodiment, one of $R^1$ and $R^2$ is a nitrile-containing hydrocarbon group while the other of $R^1$ and $R^2$ is either a hydrogen atom or hydrocarbon group. In another embodiment, both $R^1$ and $R^2$ are independently selected from nitrile-containing hydrocarbon groups. For any of the foregoing embodiments, $Y^-$ may not contain any C—N unsaturated bond, or $Y^-$ may contain at least one C—N unsaturated bond.

In other embodiments, one of $R^1$ and $R^2$ is selected to be a small hydrocarbon group of, for example, one or two carbon atoms (e.g., methyl, ethyl, or nitrile-substituted derivative thereof), while the other of $R^1$ and $R^2$ is selected to be a larger hydrocarbon group of, for example, three, four, five, six, seven, eight, nine, ten, eleven, or twelve carbon atoms (such as alkyl groups of these carbon numbers, or nitrile-substituted derivatives thereof). Moreover, these embodiments are contemplated not only for the imidazolium ring system, but in any ring system in which two groups are variable (e.g., a pyrrolidinium or piperidinium ring system when two variable groups are bound to the nitrogen atom).

In another particular embodiment, $X^+$ of the ionic liquid includes a pyrrolidinium ring. The pyrrolidinium ring can be substituted at any one, two, three, four, or five of the positions of the ring, e.g., by one, two, three, four, or five hydrocarbon groups, heteroatom groups, and/or heteroatom-substituted hydrocarbon groups on any one, two, three, four, or five of the positions of the pyrrolidinium ring. The substituents may also be interconnected, thereby including another ring fused or linked to the pyrrolidinium ring. Typically, the pyrrolidinium ring possesses a positive charge by virtue of having the nitrogen atom therein substituted by a hydrocarbon or heteroatom-substituted hydrocarbon group. However, it is contemplated herein that the pyrrolidinium ring can possess a positive charge while the nitrogen atom is not substituted (e.g., by substitution on the pyrrolidinium ring by one or more groups bearing a positive charge, such as an ammonium- or phosphonium- or sulfonium-containing group). Furthermore, the pyrrolidinium ring may possess greater than a single positive (+1) charge, e.g., by substitution of the nitrogen atom and inclusion of one or more other groups bearing a positive charge.

In a particular embodiment, the pyrrolidinium-containing ionic liquid has the structural formula:

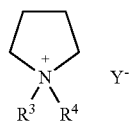

(4)

In formula (4), $R^3$ and $R^4$ are independently selected from hydrogen atom, hydrocarbon group, and groups containing a C—N unsaturated bond (for example, nitrile-containing hydrocarbon groups, as described above), and $Y^-$ is a counteranion. At least one of $R^3$ and $R^4$ is a group containing a C—N unsaturated bond when $Y^-$ does not contain a C—N unsaturated bond, and in addition, or alternatively, $Y^-$ contains at least one C—N unsaturated bond when both $R^3$ and $R^4$ do not contain a C—N unsaturated bond. In some embodiments, $R^3$ and $R^4$ are the same in structure, or carbon number, or type of hydrocarbon group. In other embodiments, $R^3$ and $R^4$ are different in structure, or carbon number, or type of hydrocarbon group.

In one embodiment of formula (4), $R^3$ and $R^4$ are independently selected from hydrogen atom and any of the hydrocarbon groups described above, wherein the hydrocarbon group can be unsubstituted or optionally substituted with one or more heteroatoms and/or heteroatom groups, and $Y^-$ represents a counteranion containing at least one C—N unsaturated bond. In one set of embodiments, both of $R^3$ and $R^4$ are hydrogen atoms. In another set of embodiments, one of $R^3$ and $R^4$ is a hydrocarbon group while the other is a hydrogen atom. In another set of embodiments, both of $R^3$ and $R^4$ are, independently, hydrocarbon groups (wherein the hydrocarbon groups can optionally be heteroatom-substituted as described above). The hydrocarbon groups can contain any number of carbon atoms, as described above; however, in particular embodiments, $R^3$ and $R^4$ are independently selected from hydrocarbon groups possessing precisely, at least, or no more than 1, 2, 3, 4, 5, 6, 7, 8, 9, 10, 11, 12, 13, 14, 15, 16, 17, or 18 carbon atoms, or a number of carbon atoms within a range bounded by any two of these carbon numbers.

In another embodiment of formula (4), the pyrrolidinium ring contains one, two, three, or more nitrile-substituted hydrocarbon groups (or alternatively, one or both of $R^3$ and $R^4$ is a nitrile-substituted hydrocarbon group) while $Y^-$ contains no C—N unsaturated bonds or groups. In another embodiment, the pyrrolidinium ring does not contain a nitrile-substituted hydrocarbon group (or alternatively, none of $R^3$ and $R^4$ is a nitrile-substituted hydrocarbon group) while $Y^-$ contains one, two, three, or more C—N unsaturated bonds or groups. By not containing a nitrile-substituted hydrocarbon group, substituents on the pyrrolidinium ring (for example, $R^3$ and $R^4$) can be limited to be, for example, hydrocarbon groups without heteroatom substitution. In yet another embodiment, the pyrrolidinium ring contains one, two, three, or more nitrile-substituted hydrocarbon groups (or alternatively, one or both of $R^3$ and $R^4$ is a nitrile-substituted hydrocarbon group) while $Y^-$ contains one, two, three, or more C—N unsaturated bonds or groups. In any of the foregoing embodiments given, the nitrile-substituted hydrocarbon group can be as further described above, including any of the embodiments provided therein (such as by formula 3).

In another particular embodiment, $X^+$ of the ionic liquid includes an acyclic ammonium group. The acyclic ammonium group possesses a positive charge by virtue of having the nitrogen atom therein bound to four groups (e.g., selected from hydrogen atom, hydrocarbon group, or heteroatom-substituted hydrocarbon group). However, the acyclic ammonium group may possess greater than a single positive (+1) charge, e.g., by including in one or more of the groups bound to the nitrogen atom one or more other groups bearing a positive charge.

In a particular embodiment, the acyclic ammonium-containing ionic liquid has the structural formula:

$$[NR^5R^6R^7R^8]^+[Y^-] \tag{5}$$

In formula (5), $R^5$, $R^6$, $R^7$, and $R^8$ are independently selected from hydrogen atom, hydrocarbon group, and groups containing a C—N unsaturated bond (for example, a nitrile-containing hydrocarbon group, as described above), and $Y^-$ is a counteranion. At least one of $R^5$, $R^6$, $R^7$, and $R^8$ is a group containing a C—N unsaturated bond when $Y^-$ does not contain a C—N unsaturated bond, and in addition, or alternatively, $Y^-$ contains at least one C—N unsaturated bond when none of $R^5$, $R^6$, $R^7$, and $R^8$ contain a C—N unsaturated bond. In some embodiments, $R^5$, $R^6$, $R^7$, and $R^8$ are the same in structure, or carbon number, or type of hydrocarbon group. In other embodiments, $R^5$, $R^6$, $R^7$, and $R^8$ are different in structure, or carbon number, or type of hydrocarbon group.

In one embodiment of formula (5), $R^5$, $R^6$, $R^7$, and $R^8$ are independently selected from hydrogen atom and any of the hydrocarbon groups described above, wherein the hydrocarbon group can be unsubstituted or optionally substituted with one or more heteroatoms and/or heteroatom groups, and $Y^-$ represents a counteranion containing at least one C—N unsaturated bond. In one set of embodiments, $R^5$, $R^6$, $R^7$, and $R^8$ are all hydrogen atoms. In another set of embodiments, one of $R^5$, $R^6$, $R^7$, and $R^8$ is a hydrocarbon group while the other three are hydrogen atoms. In another set of embodiments, two of $R^5$, $R^6$, $R^7$, and $R^8$ are, independently, hydrocarbon groups while the other two are hydrogen atoms. In another set of embodiments, three of $R^5$, $R^6$, $R^7$, and $R^8$ are, independently, hydrocarbon groups while the remaining group is a hydrogen atom. In yet another set of embodiments, all of $R^5$, $R^6$, $R^7$, and $R^8$ are, independently, hydrocarbon groups. The hydrocarbon groups can contain any number of carbon atoms, as described above; however, in particular embodiments, $R^5$, $R^6$, $R^7$, and $R^8$ are independently selected from hydrocarbon groups possessing precisely, at least, or no more than 1, 2, 3, 4, 5, 6, 7, 8, 9, 10, 11, 12, 13, 14, 15, 16, 17, or 18 carbon atoms, or a number of carbon atoms within a range bounded by any two of these carbon numbers.

In another embodiment of formula (5), one, two, three, or all of $R^5$, $R^6$, $R^7$, and $R^8$ are, independently, nitrile-substituted hydrocarbon groups, and $Y^-$ contains no C—N unsaturated bonds or groups. In another embodiment, none of $R^5$, $R^6$, $R^7$, and $R^8$ are nitrile-substituted hydrocarbon groups (for example, hydrocarbon groups without heteroatom substitution), and $Y^-$ contains one, two, three, or more C—N unsaturated bonds or groups. In yet another embodiment, one, two, three, or all of $R^5$, $R^6$, $R^7$, and $R^8$ are, independently, nitrile-substituted hydrocarbon groups, and $Y^-$ contains one, two, three, or more C—N unsaturated bonds or groups. In any of the foregoing embodiments given, the nitrile-substituted hydrocarbon group can be as further described above, including any of the embodiments provided therein (such as by formula 3).

In yet other embodiments of formula (5), one, two, three, or four of $R^5$, $R^6$, $R^7$, and $R^8$ are carbonyl-linking groups (i.e., —C(O)R groups) where R is H or a hydrocarbon group. Any remaining $R^5$, $R^6$, $R^7$, and $R^8$ groups are selected from hydrogen and hydrocarbon groups. In some embodiments, if at least one of $R^5$, $R^6$, $R^7$, and $R^8$ is a carbonyl-linking group, then at least one of the remaining $R^5$, $R^6$, $R^7$, and $R^8$ groups is a hydrogen atom. In other embodiments, if at least one of $R^5$, $R^6$, $R^7$, and $R^8$ is a carbonyl-linking group, then at least one, or two, or all of the remaining $R^5$, $R^6$, $R^7$, and $R^8$ groups are hydrocarbon groups. Some examples of carbonyl-linking groups include formyl, acetyl, propionyl, butyryl, acryloyl, and benzoyl groups.

In another embodiment, the ionic liquid used as a carbon precursor herein contains at least one imino (i.e., C═N) bond in either the $X^+$ portion or $Y^-$ portion of the ionic liquid. The imino bond can be part of, for example, an acyclic group or cyclic group. In particular embodiments, the imino bond is part of a guanidinium structure. In further embodiments, the imino-containing (or guanidinium structure) is an imino-containing (or guanidinium-containing) ring or ring system.

In a particular set of embodiments, $X^+$ has a guanidinium composition within the following generic formula:

(6)

In formula (6), $R^{50}$, $R^{51}$, $R^{52}$, $R^{53}$, and $R^{54}$ are independently selected from a hydrogen atom or any of the unsubstituted or heteroatom-substituted hydrocarbon groups described above, and particularly, those hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups). In a particular embodiment, $R^{50}$, $R^{51}$, $R^{52}$, $R^{53}$, and $R^{54}$ are all hydrogen atoms. In other embodiments, a provision is made that $R^{50}$, $R^{51}$, $R^{52}$, $R^{53}$, and $R^{54}$ cannot all be hydrogen atoms (or that at least one of $R^{50}$, $R^{51}$, $R^{52}$, $R^{53}$, and $R^{54}$ is a hydrocarbon group). In a particular set of embodiments, $R^{54}$ is a hydrogen atom while one, two, three, or all of $R^{50}$, $R^{51}$, $R^{52}$, and $R^{53}$ are hydrocarbon groups, and particularly, methyl, ethyl, n-propyl, and/or isopropyl groups. In other embodiments, a provision is made that $R^{54}$ is not a hydrogen atom (or that $R^{54}$ is a hydrocarbon group). In other embodiments, a provision is made that if $R^{54}$ is a hydrogen atom, then $R^{50}$, $R^{51}$, $R^{52}$, and $R^{53}$ cannot all be methyl groups (or alternatively, if $R^{50}$, $R^{51}$, $R^{52}$, and $R^{53}$ are all methyl groups, then $R^{54}$ is not a hydrogen atom). In another particular set of embodiments, $R^{50}$, $R^{51}$, $R^{52}$, $R^{53}$, and $R^{54}$ are all hydrocarbon groups, and in particular embodiments, selected from methyl, ethyl, n-propyl, and/or isopropyl groups. Optionally, two or more of $R^{50}$, $R^{51}$, $R^{52}$, $R^{53}$, and $R^{54}$ are interconnected, thereby resulting in a cyclic or polycyclic (e.g., bicyclic, tricyclic, or higher cyclic) guanidinium species. The hydrogen ion depicted in formula (6) by the symbol .$H^+$ is typically attached to one or more of the nitrogen atoms of the chemical structure, and more typically, to the nitrogen atom attached to $R^{54}$.

In particular embodiments of formula (6), $R^{50}$ and $R^{52}$ are interconnected. The resulting cyclic guanidinium species are encompassed by the following chemical formula:

(7)

In formula (7), $R^{51}$, $R^{53}$, and $R^{54}$ are as defined under formula (6), including exemplary embodiments provided therein. The curve shown in formula (7) represents a linking group that interconnects the two shown nitrogen atoms. The linking group includes any of the unsubstituted or heteroatom-substituted hydrocarbon linking groups described above, and particularly, those containing 2, 3, or 4 carbon atoms (particularly, ethylene, trimethylene and tetramethylene linkers). In a particular embodiment, $R^{51}$, $R^{53}$, and $R^{54}$ are all hydrogen atoms. In other embodiments, a provision is made that $R^{51}$, $R^{53}$, and $R^{54}$ cannot all be hydrogen atoms (or that at least one of $R^{51}$, $R^{53}$, and $R^{54}$ is a hydrocarbon group). In a particular set of embodiments, $R^{54}$ is a hydrogen atom while one or both of $R^{51}$ and $R^{53}$ are hydrocarbon groups, and particularly, methyl, ethyl, n-propyl, and/or isopropyl groups. In other embodiments, a provision is made that $R^{54}$ is not a hydrogen atom (or that $R^{54}$ is a hydrocarbon group). In other embodiments, a provision is made that if $R^{54}$ is a hydrogen atom, then $R^{51}$ and $R^{53}$ cannot both be methyl groups. In another particular set of embodiments, $R^{51}$, $R^{53}$, and $R^{54}$ are all hydrocarbon groups, and particularly, methyl, ethyl, n-propyl, and/or isopropyl groups.

In particular embodiments of formula (7), the linker is a trimethylene linker, thereby resulting in $X^+$ being a cyclic guanidinium species within the following chemical formula:

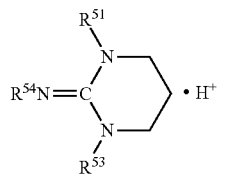

(7a)

In formula (7a), $R^{51}$, $R^{53}$, and $R^{54}$ are as defined under formulas (6) and (7), including exemplary embodiments provided therein.

In other particular embodiments of formula (6), $R^{50}$ and $R^{54}$ are interconnected. The resulting cyclic guanidinium species are encompassed by the following chemical formula:

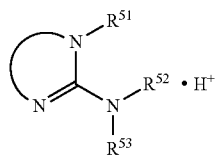

(8)

In formula (8), $R^{51}$, $R^{52}$, and $R^{53}$ are as defined under formula (6), including exemplary embodiments provided therein. The curve shown in formula (8) represents a linking group that interconnects the two shown nitrogen atoms. The linking group includes any of the unsubstituted or heteroatom-substituted hydrocarbon linking groups described above, and particularly, those containing 2, 3, or 4 carbon atoms (particularly, ethylene, trimethylene and tetramethylene linkers). In a particular embodiment, $R^{51}$, $R^{52}$, and $R^{53}$ are all hydrogen atoms. In other embodiments, a provision is made that $R^{51}$, $R^{52}$, and $R^{53}$ cannot all be hydrogen atoms (or that one, two, or all of $R^{51}$, $R^{52}$, and $R^{53}$ are hydrocarbon groups). In another particular set of embodiments, $R^{51}$, $R^{52}$, and $R^{53}$ are all hydrocarbon groups, and particularly, methyl, ethyl, n-propyl, and/or isopropyl groups.

In particular embodiments of formula (8), the linker is a trimethylene linker, thereby resulting in $X^+$ having a cyclic guanidinium species within the following chemical formula:

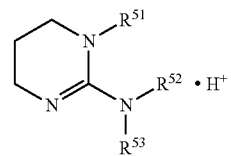

(8a)

In formula (8a), $R^{51}$, $R^{52}$, and $R^{53}$ are as defined under formula (6), including exemplary embodiments provided therein.

In a further embodiment of formula (8a), $R^{51}$ and $R^{52}$ are additionally interconnected. The resulting bicyclic guanidinium species are encompassed by the following chemical formula:

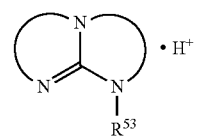

(9)

In formula (9), $R^{53}$ is a hydrogen atom or hydrocarbon group, as defined under formula (6) above, including exemplary embodiments therein. The curves shown in formula (9) represent linking groups that interconnect the shown nitrogen atoms. The linking groups can independently be any of the unsubstituted or heteroatom-substituted hydrocarbon linking groups described above, and particularly, those containing 2, 3, or 4 carbon atoms (particularly, ethylene, trimethylene and tetramethylene linkers). In particular embodiments of formula (9), at least one of the two linkers is a trimethylene linker.

In particular embodiments of formula (9), both linkers are trimethylene linkers, thereby resulting in cyclic guanidinium species encompassed by the following chemical formula:

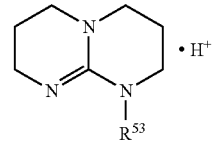

(9a)

In formula (9a), $R^{53}$ is a hydrogen atom or hydrocarbon group, as defined under formula (6) above, including exemplary embodiments therein.

In other particular embodiments of formula (6), one or both of the shown amino groups (i.e., one or both of —$NR^{50}R^{51}$ and —$NR^{52}R^{53}$) independently represent an imino group of formula (1a). In a particular set of embodiments, both aforesaid amino groups are imino groups, and the resulting guanidinium species of $X^+$ are encompassed by the following formula:

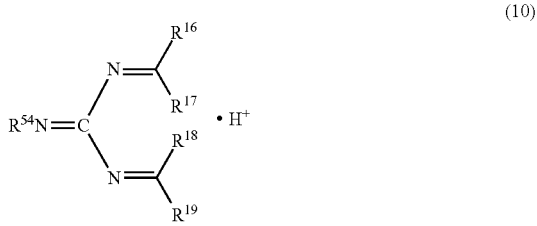

(10)

In formula (10) above, $R^{16}$, $R^{17}$, $R^{18}$, and $R^{19}$ are independently selected from a hydrogen atom, and/or substituted or unsubstituted hydrocarbon groups (including phosphorus-containing groups), and/or amino groups of formula (1), and/or imino groups of formula (1a), and/or phosphazeno groups of formulas (1b), (1c), (1d), and/or (1e), as described above. The group $R^{54}$ is selected from a hydrogen atom or any of the unsubstituted or heteroatom-substituted hydrocarbon groups described above. Optionally, two or more of $R^{16}$, $R^{17}$, $R^{18}$, $R^{19}$, and $R^{54}$ are interconnected as described above. For any interconnection that occurs under formula (10), any one or more of the groups $R^{16}$, $R^{17}$, $R^{18}$, $R^{19}$, and $R^{54}$ can be a linking bond (i.e., instead of a group) that links with a group, thereby allowing the resulting linker to contain as few as one carbon atom (e.g., —$CH_2$—, or =CH—) or a heteroatom (e.g., —O—, or —N=).

In a particular set of embodiments of formula (10), each of the groups $R^{16}$, $R^{17}$, $R^{18}$, and $R^{19}$ are amino groups according to formula (1). The resulting guanidinium species of $X^+$ are encompassed by the following chemical formula:

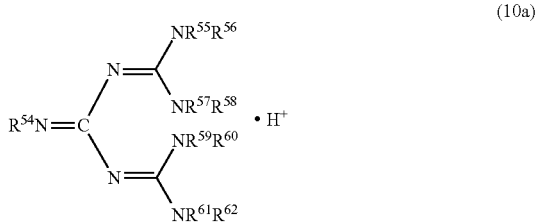

(10a)

In formula (10a), $R^{54}$, $R^{55}$, $R^{56}$, $R^{57}$, $R^{58}$, $R^{59}$, $R^{60}$, $R^{61}$, and $R^{62}$ are each independently selected from a hydrogen atom or any of the unsubstituted or heteroatom-substituted hydrocarbon groups described above, and particularly, those hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups). In a particular embodiment, $R^{54}$, $R^{55}$, $R^{56}$, $R^{57}$, $R^{58}$, $R^{59}$, $R^{60}$, $R^{61}$, and $R^{62}$ are all hydrogen atoms. In other embodiments, a provision is made that $R^{54}$, $R^{55}$, $R^{56}$, $R^{57}$, $R^{58}$, $R^{59}$, $R^{60}$, $R^{61}$, and $R^{62}$ cannot all be hydrogen atoms (or that at least one of $R^{54}$, $R^{55}$, $R^{56}$, $R^{57}$, $R^{58}$, $R^{59}$, $R^{60}$, $R^{61}$, and $R^{62}$ is a hydrocarbon group). In a particular set of embodiments, $R^{54}$ is a hydrogen atom while one two, three, four, five, six, seven, or all of $R^{55}$, $R^{56}$, $R^{57}$, $R^{58}$, $R^{59}$, $R^{60}$, $R^{61}$, and $R^{62}$ are hydrocarbon groups, and particularly, independently selected from methyl, ethyl, n-propyl, and/or isopropyl groups. In other embodiments, a provision is made that $R^{54}$ is not a hydrogen atom (or that $R^{54}$ is a hydrocarbon group). In another particular set of embodiments, $R^{54}$, $R^{55}$, $R^{56}$, $R^{57}$, $R^{58}$, $R^{59}$, $R^{60}$, $R^{61}$, and $R^{62}$ are all hydrocarbon groups, and particularly, selected from methyl, ethyl, n-propyl, and/or isopropyl groups. Optionally, two or more of $R^{54}$, $R^{55}$, $R^{56}$, $R^{57}$, $R^{58}$, $R^{59}$, $R^{60}$, and $R^{62}$ are interconnected, thereby resulting in a cyclic or polycyclic (e.g., bicyclic, tricyclic, or higher cyclic) guanidinium species. For any interconnection that occurs under formula (10a), any one or more of the groups $R^{54}$, $R^{55}$, $R^{56}$, $R^{57}$, $R^{58}$, $R^{59}$, $R^{60}$, $R^{61}$, and $R^{62}$ can be a linking bond (i.e., instead of a group) that links with a group, as described above under formula (10).

Any one, two, three or all of the above amino groups —$NR^{55}R^{56}$, —$NR^{57}R^{58}$, —$NR^{59}R^{60}$, and —$NR^{61}R^{62}$ of formula (10a) can also be imino groups according to formula (1a). Any one, two, three or all of the above amino groups —$NR^{55}R^{56}$, —$NR^{57}R^{58}$, —$NR^{59}R^{60}$, and —$NR^{61}R^{62}$ can also be phosphazeno groups selected from formulas (1b), (1c), (1d), and/or (1e).

In other particular embodiments of formula (6), one or both of the shown amino groups (i.e., one or both of —$NR^{50}R^{51}$ and —$NR^{52}R^{53}$) independently represent a phosphazeno group selected from formulas (1b), (1c), (1d), and/or (1e). In a particular set of embodiments, both aforesaid amino groups are phosphazeno groups, and the resulting guanidinium species of $X^+$ are encompassed by the following formula:

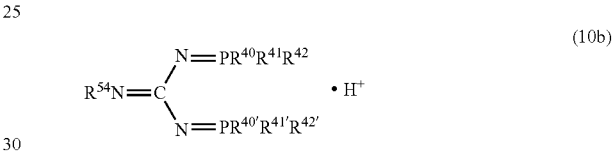

(10b)

In formula (10b) above, $R^{40}$, $R^{41}$, $R^{42}$, $R^{40'}$, $R^{41'}$, and $R^{42'}$ are independently selected from unsubstituted or heteroatom-substituted hydrocarbon groups, and/or amino groups according to formula (1), and/or imino groups according to formula (1a), and/or phosphazeno groups according to formulas (1b), (1c), (1d), and/or (1e). The group $R^{54}$ is as defined under formula (6). Optionally, two or more of $R^{40}$, $R^{41}$, $R^{42}$, $R^{40'}$, $R^{41'}$, $R^{42'}$, and $R^{54}$ are interconnected as described above. For any interconnection that occurs under formula (10b), any one or more of the groups $R^{40}$, $R^{41}$, $R^{42}$, $R^{40'}$, $R^{41'}$, $R^{42'}$, and $R^{54}$ can be a linking bond (i.e., instead of a group) that links with a group, as described above under formula (10).

In a particular set of embodiments of formula (10b), each of the groups $R^{40}$, $R^{41}$, $R^{42}$, $R^{40'}$, $R^{41'}$, and $R^{42'}$ are amino groups according to formula (1). The resulting guanidinium species are encompassed by the following chemical formula:

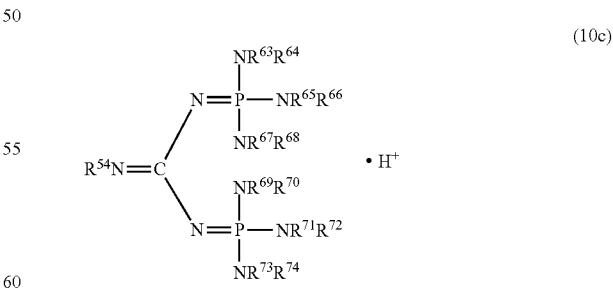

(10c)

In formula (10c), $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ are independently selected from a hydrogen atom or any of the unsubstituted or heteroatom-substituted hydrocarbon groups described above, and particularly, those hydrocarbon groups containing at least one, two, or three carbon atoms and up to four, five, six, seven, or eight carbon atoms (e.g., methyl, ethyl, n-propyl, isopropyl, n-butyl, isobutyl, sec-butyl, t-butyl, n-pentyl, isopentyl, neopentyl, n-hexyl, n-heptyl, n-octyl, isooctyl, phenyl, benzyl, and tolyl groups). In a particular embodiment, $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ are all hydrogen atoms. In other embodiments, a provision is made that $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ are not all hydrogen atoms (or that at least one of $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ is a hydrocarbon group). In a particular set of embodiments, $R^{54}$ is a hydrogen atom while one, two, three, four, five, six, seven, eight, nine, ten, eleven, or all of $R^{63}$, $R^{64}$, $R^{65}$, $R^{66}$, $R^{67}$, $R^{68}$, $R^{69}$, $R^{70}$ $R^{71}$, $R^{72}$, $R^{73}$, and $R^{74}$ are hydrocarbon groups, and particularly, methyl, ethyl, n-propyl, and/or isopropyl groups. In other embodiments, a provision is made that $R^{54}$ is not a hydrogen atom (or that $R^{54}$ is a hydrocarbon group). In another particular set of embodiments, $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ are all hydrocarbon groups, and particularly, methyl, ethyl, n-propyl, and/or isopropyl groups. Optionally, two or more of $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ are interconnected, thereby resulting in a cyclic or polycyclic (e.g., bicyclic, tricyclic, or higher cyclic) guanidinium species. For any interconnection that occurs under formula (10c), any one or more of the groups $R^{54}$, $R^{63}$, $R^{64}$, $R^{65}$, $R^{66}$, $R^{67}$, $R^{68}$, $R^{69}$, $R^{70}$, $R^{71}$, $R^{72}$, $R^{73}$, and $R^{74}$ can be a linking bond (i.e., instead of a group) that links with a group, as described above under formula (10).

Any one, two, three, four, five, or all of the above amino groups $-NR^{63}R^{64}$, $-NR^{65}R^{66}$, $-NR^{67}R^{68}$, $-NR^{69}R^{70}$, $-NR^{71}R^{72}$, and $-NR^{73}R^{74}$ of formula (10c) can also be imino groups according to formula (1a). Any one, two, three or all of the above amino groups $-NR^{63}R^{64}$, $-NR^{65}R^{66}$, $-NR^{67}R^{68}$, $-NR^{69}R^{70}$, $-NR^{71}R^{72}$, and $-NR^{73}R^{74}$ can also be phosphazeno groups selected from formulas (1b), (1c), (1d), and/or (1e).

For the guanidinium species encompassed under formula (6), and subformulas more limited in scope, group $R^{54}$ can also be a phosphorus-containing group. For example, in particular embodiments, formula (6) encompasses guanidinium-phosphazene species of the following chemical formula:

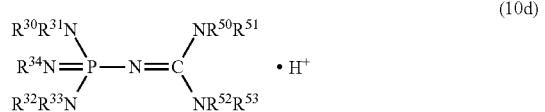

(10d)

In formula (10d), $R^{30}$, $R^{31}$, $R^{32}$, $R^{33}$, $R^{34}$, $R^{50}$, $R^{51}$, $R^{52}$, and $R^{53}$ are independently selected from a hydrogen atom, and/or substituted or unsubstituted hydrocarbon groups (including phosphorus-containing groups), and/or amino groups of formula (1), and/or imino groups of formula (1a), and/or phosphazeno groups of formulas (1b), (1c), (1d), and/or (1e), as described above.

Any one, two, three, or all of the above amino groups $-NR^{50}R^{51}$, $-NR^{52}R^{53}$, $-NR^{30}R^{31}$, and $-NR^{32}R^{33}$ in formula (10d) can also be imino groups according to formula (1a). Any one, two, three or all of the above amino groups $-NR^{50}R^{51}$, $-NR^{52}R^{53}$, $-NR^{30}R^{31}$, and $-NR^{32}R^{33}$ in formula (10d) can also be phosphazeno groups selected from formulas (1b), (1c), (1d), and/or (1e).

Optionally, two or more of $R^{30}$, $R^{31}$, $R^{32}$, $R^{33}$, $R^{34}$, $R^{50}$, $R^{51}$, $R^{52}$, and $R^{53}$ are interconnected, thereby resulting in a cyclic or polycyclic (e.g., bicyclic, tricyclic, or higher cyclic) guanidinium species. For any interconnection that occurs under formula (10d), any one or more of the groups $R^{30}$, $R^{31}$, $R^{32}$, $R^{33}$, $R^{34}$, $R^{50}$, $R^{51}$, $R^{52}$, and $R^{53}$ can be a linking bond (i.e., instead of a group) that links with a group, as described above under formula (10).

In particular embodiments, the ionic liquid contains an $X^+$ portion that includes an imino-containing ring system (specifically, a cyclic guanidinium ring system) having the following structural formula:

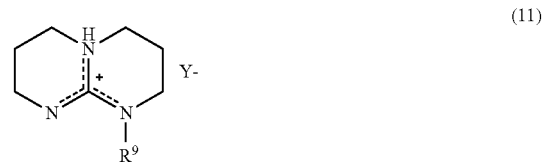

(11)

In formula (11), $R^9$ can be a hydrogen atom or any of the hydrocarbon groups described above, wherein the hydrocarbon group can be unsubstituted or optionally substituted with one or more heteroatoms and/or heteroatom groups, and $Y^-$ represents a counteranion. The dotted lines in formula (11) indicate the delocalization of double bonds, as known in the art to occur in guanidinium systems. Moreover, the positive charge shown in formula (11) is not meant to indicate a specific location of the positive charge (the positive charge may reside at any suitable location of the ring system, or be delocalized). Likewise, the hydrogen atom shown in formula (11) is not meant to indicate a specific location that the hydrogen atom resides (the hydrogen atom may reside at any suitable location, such as any of the three nitrogen atoms, or be in a fluxional state).

When $R^9$ is a hydrocarbon group, the hydrocarbon group can contain any number of carbon atoms, as described above; however, in particular embodiments, $R^9$ is selected from hydrocarbon groups possessing precisely, at least, or no more than 1, 2, 3, 4, 5, 6, 7, 8, 9, 10, 11, 12, 13, 14, 15, 16, 17, or 18 carbon atoms, or a number of carbon atoms within a range bounded by any two of these carbon numbers.

The guanidinium group of formula (11) possesses, by its very nature, at least one C—N unsaturated bond. Therefore, the guanidinium-containing ionic liquids of formula (11) are suitable herein as carbon precursors even if the guanidinium portion contains no further C—N unsaturated bonds or groups and if $Y^-$ contains no C—N unsaturated bond or group.

In one embodiment, the guanidinium ring system in formula (11) contains one, two, three, or more additional C—N unsaturated bonds or groups (e.g., one or more nitrile or nitrile-containing hydrocarbon groups) while $Y^-$ contains no C—N unsaturated bonds or groups. Typically, the one or more C—N unsaturated bonds or groups are introduced by the group $R^9$ in formula (11). In another embodiment, the guanidinium ring system contains no additional C—N unsaturated bonds or groups (for example, when $R^9$ is hydrogen or an unsubstituted hydrocarbon group) while $Y^-$ contains one, two, three, or more C—N unsaturated bonds or groups. In yet another embodiment, the guanidinium ring system contains one, two, three, or more additional C—N unsaturated bonds or groups while $Y^-$ also contains one, two, three, or more C—N unsaturated bonds or groups. In any of the foregoing embodiments, the C—N unsaturated bond or group can refer to a nitrile (CN) group, or a nitrile-substituted hydrocarbon group, as further described above, including any of the embodiments provided therein (such as by formula 3). In specific embodiments, $R^9$ in formula (11) is a nitrile-substituted hydrocarbon group, as further described above, such as any of the embodiments provided therein (such as in formula 3).

In another embodiment, $X^+$ can be a conjugate acid of a base or superbase, and $Y^-$ a conjugate base of an acid or superacid, wherein either of $X^+$ and $Y^+$, or both, contain at least one C—N unsaturated bond. In particular embodiments, the ionic liquid is a protic ionic liquid (i.e., PIL). In a protic ionic liquid, the cationic portion $X^+$ of the ionic liquid is a result of protonation of a base or superbase X by an acid or superacid HY.

If $X^+$ is the conjugate acid of a superbase X, then X can be any superbase. Generally, a superbase is distinguished from an ordinary base by having an acid dissociation constant, i.e., pKa, of its conjugate acid, of 20 or above in acetonitrile (or 12 or above in water). In other embodiments, the superbase is characterized by having a pKa of its conjugate acid $BH^+$ of at least 21, 22, 23, 24, 25, 26, 27, 28, 29, or 30 in acetonitrile, or at least 13, 14, 15, or 16 in water. The superbase typically contains one or more imino groups of formula (1a) and/or one or more phosphazeno groups selected from formulas (1b)-(1e). When $X^+$ is the conjugate acid of a superbase that does not contain a C—N unsaturated bond, then $Y^-$ contains at least one C—N unsaturated bond. When $X^+$ is the conjugate acid of a superbase that contains at least one C—N unsaturated bond (such as an imino group of formula 1a), then $Y^-$ may or may not contain at least one C—N unsaturated bond.

The counteranion species $Y^-$ can be any anionic species that, when complexed with the species $X^+$, results in an ionic liquid. For example, in different embodiments, the corresponding species $Y^-$ can be inorganic or organic, contain fluorine atoms or lack fluorine atoms, and be either symmetrical or asymmetrical in structure. Some examples of common anionic species considered herein for $Y^-$ include, for example, the halides (e.g., fluoride, chloride, bromide, and iodide), carbonate, bicarbonate, the carboxylates (e.g., formate, acetate, propionate, butyrate, valerate, lactate, pyruvate, oxalate, malonate, glutarate, adipate, decanoate, and fluorocarboxylates, e.g., trifluoroacetate), hexafluorophosphate ($PF_6^-$), hexachlorophosphate ($PCl_6^-$), perchlorate, chlorate, chlorite, perbromate, bromate, bromite, periodiate, iodate, the alkoxides (e.g., methoxide, ethoxide, isopropoxide, phenoxide, and fluoroalkoxides, e.g., $CF_3O^-$), the amides (e.g., dimethylamide and diisopropylamide), diketonates (e.g., acetylacetonate), aluminum halides (e.g., $Al_2Cl_7^-$, $AlCl_4^-$, $AlF_4^-$, and $AlBr_4^-$), nitrate, nitrite, sulfate, bisulfate, sulfite, bisulfate, the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, and the like), phosphate, hydrogenphosphate, dihydrogenphosphate, pyrophosphate, phosphite, arsenate, hydrogenarsenate, dihydrogenarsenate, selenate, tellurate, tungstate, molybdate, chromate, silicate, the borates (e.g., borate, diborate, triborate, tetraborate, and tetrafluoroborate), anionic borane, carborane clusters (e.g., $B_{10}H_{10}^{2-}$ and $B_{12}H_{12}^{2-}$), perrhenate, permanganate, ruthenate, perruthenate, metal halides (e.g., transition metal halides, such as $PdCl_4^-$) and the polyoxometallates.

In particular embodiments, the counteranion $Y^-$ is a nitrile-containing anion, such as dicyanamide (i.e., $N(CN)_2^-$), tricyanomethanide (i.e., $C(CN)_3^-$), tetrakis(4-cyanophenyl)borate. (i.e., $B(PhCN)_4^-$), or tetracyanoborate (i.e., $B(CN)_4^-$).

Organic derivatives of any inorganic species described above are also contemplated for $Y^-$. Some examples of these types of species include the organoborates (e.g., $BR_1R_2R_3R_4^-$, wherein $R_1$, $R_2$, $R_3$, $R_4$ are typically hydrocarbon groups containing 1 to 6 carbon atoms), the alkylsulfates (e.g., diethylsulfate), alkylphosphates (e.g., ethylphosphate or diethylphosphate), and the phosphinates (e.g., bis-(2,4,4-trimethylpentyl)phosphinate).

In a particular embodiment, the species $Y^-$ of the ionic liquid is derived from a superacid HY. As generally understood in the art, the term "superacid" as used herein is generally understood to mean an acid having an acidity greater than (or pKa less than) conventional mineral acids, and particularly, an acidity greater than (or pKa less than) pure (i.e., 100%) sulfuric acid. As 100% sulfuric acid is known to have a pKa of −3, the superacids considered herein preferably possess a pKa of less than −3. For example, in different embodiments, it may be preferred for the superacid to have a pKa of or less than about −4, −5, −6, −7, −8, −9, −10, −11, −12, −13, −14, −15, −16, −17, −18, −19, −20, −21, −22, −23, −24, or −25. In one embodiment, the superacid does not contain fluorine atoms, while in another embodiment, the superacid contains one, two, three, or more fluorine atoms. Some examples of known superacids include fluorosulfonic acid ($FSO_3H$), hexafluoroantimonic acid ($HSbF_6$), hexafluoroarsenic acid ($HAsF_6$), hexafluorotantalum acid ($HTaF_6$), and hexafluoroniobium acid ($HNbF_6$). The corresponding conjugate base species $Y^-$ of the foregoing superacids are, respectively, fluorosulfonate ($FSO_3^-$), hexafluoroantimonate ($SbF_6^-$), hexafluoroarsenate ($AsF_6^-$), hexafluorotantalate ($TaF_6^-$), and hexafluoroniobate ($NbF_6^-$).

In a particular set of embodiments, the species $Y^-$ of the protic ionic liquid has a formula within the general chemical formula:

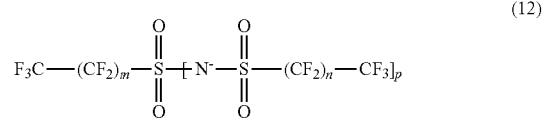

(12)

In formula (12) above, subscripts m and n are independently 0 or an integer of 1 or above. Subscript p is 0 or 1, provided that when p is 0, the group —N—$SO_2$—$(CF_2)_n CF_3$ subtended by p is replaced with an oxide atom connected to the sulfur atom (S).

In one embodiment of formula (12), subscript p is 1, and thus, formula (12) reduces to the chemical formula:

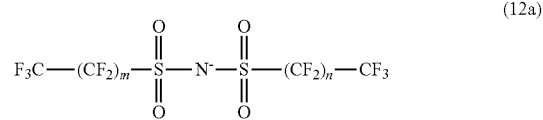

(12a)

In one embodiment of formula (12a), the shown perfluoroalkyl groups do not crosslink with each other, thereby resulting in a non-cyclic anion. In a further embodiment, m and n are the same number, thereby resulting in a symmetrical counteranion. In another further embodiment, m and n are not the same number, thereby resulting in an asymmetrical counteranion.

In a first set of embodiments of formula (12a), in and n are independently at least 0 and up to 1, 2, 3, 4, 5, 6, 7, 8, 9, 10, or 11. When m and n are both 0, the resulting anion has the formula $CF_3SO_2NSO_2CF_3$, i.e., bis(trifluoromethylsulfonyl) imide, or $Tf_2N^-$. In another embodiment, in and n are not both 0. For example, in a particular embodiment, m is 0 while n is a value of 1 or above (e.g., 1, 2, 3, 4, 5, 6, 7, 8, 9, 10, or 11).

Some examples of such anions include $CF_3SO_2NSO_2CF_2CF_3$, $CF_3SO_2NSO_2(CF_2)_2CF_3$, $CF_3SO_2NSO_2(CF_2)_3CF_3$, $CF_3SO_2NSO_2(CF_2)_4CF_3$, $CF_3SO_2NSO_2(CF_2)_5CF_3$, and so on, wherein it is understood that, in the foregoing examples, the negative sign indicative of a negative charge (i.e., "−") in the anion has been omitted for the sake of clarity.

In a second set of embodiments of formula (12a), in and n are independently at least 1 and up to 2, 3, 4, 5, 6, 7, 8, 9, 10, or 11. For example, in a particular embodiment, m is 1 while n is a value of 1 or above (e.g., 1, 2, 3, 4, 5, 6, 7, 8, 9, 10, or 11). Some examples of such anions include $N[SO_2CF_2CF_3]_2$ (i.e., "BETI⁻"), $CF_3CF_2SO_2NSO_2(CF_2)_2CF_3$, $CF_3CF_2SO_2NSO_2(CF_2)_3CF_3$, $CF_3CF_2SO_2NSO_2(CF_2)_4CF_3$, $CF_3CF_2SO_2NSO_2(CF_2)_5CF_3$, and so on.

In a third set of embodiments of formula (12a), m and n are independently at least 2 and up to 3, 4, 5, 6, 7, 8, 9, 10, or 11. For example, in a particular embodiment, m is 2 while n is a value of 2 or above (e.g., 2, 3, 4, 5, 6, 7, 8, 9, 10, or 11). Some examples of such anions include $N[SO_2(CF_2)_2CF_3]_2$, $CF_3(CF_2)_2SO_2NSO_2(CF_2)_3CF_3$, $CF_3(CF_2)_2SO_2NSO_2(CF_2)_4CF_3$, $CF_3(CF_2)_2SO_2NSO_2(CF_2)_5CF_3$, and so on.

In a fourth set of embodiments of formula (12a), m and n are independently at least 3 and up to 4, 5, 6, 7, 8, 9, 10, or 11. For example, in a particular embodiment, m is 3 while n is a value of 3 or above (e.g., 3, 4, 5, 6, 7, 8, 9, 10, or 11). Some examples of such anions include $N[SO_2(CF_2)_3CF_3]_2$, $CF_3(CF_2)_3SO_2NSO_2(CF_2)_4CF_3$, $CF_3(CF_2)_3SO_2NSO_2(CF_2)_5CF_3$, $CF_3(CF_2)_3SO_2NSO_2(CF_2)_6CF_3$, $CF_3(CF_2)_3SO_2NSO_2(CF_2)_7CF_3$, and so on.

In a fifth set of embodiments of formula (12a), m and n are independently at least 4 and up to 5, 6, 7, 8, 9, 10, or 11. For example, in a particular embodiment, m is 4 while n is a value of 4 or above (e.g., 4, 5, 6, 7, 8, 9, 10, or 11). Some examples of such anions include $N[SO_2(CF_2)_4CF_3]_2$, $CF_3(CF_2)_4SO_2NSO_2(CF_2)_5CF_3$, $CF_3(CF_2)_4SO_2NSO_2(CF_2)_6CF_3$, $CF_3(CF_2)_4SO_2NSO_2(CF_2)_7CF_3$, $CF_3(CF_2)_4SO_2NSO_2(CF_2)_8CF_3$, and so on.

In a sixth set of embodiments of formula (12a), m and n are independently at least 5 and up to 6, 7, 8, 9, 10, or 11. For example, in a particular embodiment, m is 5 while n is a value of 5 or above (e.g., 5, 6, 7, 8, 9, 10, or 11). Some examples of such anions include $N[SO_2(CF_2)_5CF_3]_2$, $CF_3(CF_2)_5SO_2NSO_2(CF_2)_6CF_3$, $CF_3(CF_2)_5SO_2NSO_2(CF_2)_7CF_3$, $CF_3(CF_2)_5SO_2NSO_2(CF_2)_8CF_3$, $CF_3(CF_2)_5SO_2NSO_2(CF_2)_9.CF_3$, and so on.

In a seventh set of embodiments of formula (12a), in and n are independently at least 6 and up to 7, 8, 9, 10, or 11. For example, in a particular embodiment, m is 6 while n is a value of 6 or above (e.g., 6, 7, 8, 9, 10, or 11). Some examples of such anions include $N[SO_2(CF_2)_6CF_3]_2$, $CF_3(CF_2)_6SO_2NSO_2(CF_2)_7CF_3$, $CF_3(CF_2)_6SO_2NSO_2(CF_2)_8CF_3$, $CF_3(CF_2)_6SO_2NSO_2(CF_2)_9CF_3$, $CF_3(CF_2)_6SO_2NSO_2(CF_2)_{10}CF_3$, and so on.

In an eighth set of embodiments of formula (12a), in and n are independently at least 7 and up to 8, 9, 10, or 11. For example, in a particular embodiment, in is 7 while n is a value of 7 or above (e.g., 7, 8, 9, 10, or 11). Some examples of such anions include $N[SO_2(CF_2)_7CF_3]_2$, $CF_3(CF_2)_7SO_2NSO_2(CF_2)_8CF_3$, $CF_3(CF_2)_7SO_2NSO_2(CF_2)_9CF_3$, $CF_3(CF_2)_7SO_2NSO_2(CF_2)_{10}CF_3$, and $CF_3(CF_2)_7SO_2NSO_2(CF_2)_{11}CF_3$.

In other embodiments of formula (12a), m abides by one or a number of alternative conditions set forth in one of the foregoing eight embodiments while n abides by one or a number of alternative conditions set forth in another of the foregoing eight embodiments.

In yet another embodiment of formula (12a), the two fluoroalkyl chains shown therein are crosslinked to form a cyclic anion structure (i.e., along with removal of two fluorine atoms). In a particular embodiment, the cyclic anion has a formula within the following generic formula:

(12b)

In formula (12b) above, subscript v preferably has a value of 0, 1, or 2, to produce, respectively, a five-membered, six-membered, or seven-membered ring. Although formula (12b) is shown as an unbranched and saturated cyclic system containing difluoromethylene units, the cyclic anion can also be branched (e.g., by the presence of —$CH_3$ or $CF_3$ groups) and/or unsaturated (e.g., by the presence of a —CF=CF— group).

In another embodiment, subscript p in formula (12) is 0, so that formula (12) reduces to the chemical formula:

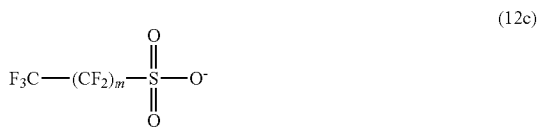

(12c)

In different exemplary embodiments of formula (12c), in can be 0 or above (e.g., up to 1, 2, 3, 4, 5, 6, 7, 8, 9, 10, or 11), 1 or above (e.g., up to 2, 3, 4, 5, 6, 7, 8, 9, 10, or 11), 2 or above (e.g., up to 3, 4, 5, 6, 7, 8, 9, 10, or 11), 3 or above (e.g., up to 4, 5, 6, 7, 8, 9, 10, or 11), 4 or above (e.g., up to 5, 6, 7, 8, 9, 10, or 11), 5 or above (e.g., up to 6, 7, 8, 9, 10, or 11), 6 or above (e.g., up to 7, 8, 9, 10, or 11), 7 or above (e.g., up to 8, 9, 10, 11, or 12), 8 or above (e.g., up to 9, 10, 11, or 12), or 9 or above (e.g., up to 10, 11, 12, 13, 14, 15, or 16). Some examples of such anions include $CF_3SO_3^-$ (i.e., "triflate" or "TfO⁻"), $CF_3CF_2SO_3^-$, $CF_3(CF_2)_2SO_3^-$, $CF_3(CF_2)_3SO_3^-$ (i.e., "nonaflate" or "NfO⁻"), $CF_3(CF_2)_4SO_3^-$, $CF_3(CF_2)_5SO_3^-$, $CF_3(CF_2)_6SO_3^-$, $CF_3(CF_2)_7SO_3^-$, $CF_3(CF_2)_8SO_3^-$, $CF_3(CF_2)_9SO_3^-$, $CF_3(CF_2)_{10}SO_3^-$, $CF_3(CF_2)_{11}SO_3^-$, and so on.

Anionic species (i.e., HY or Y⁻), including acid and super-acid forms, are generally well-known in the art, and numerous of them are commercially available.

The ionic liquids described above can be synthesized by procedures well-known in the art. Aprotic ionic liquids, in particular, can be generally synthesized by a combination of alkylation and metathesis reactions, as described, for example, in P. Bonhote, et al., *Inorg. Chem.*, 35, pp. 1168-1178 (1996) and J. F. Huang, et al., *J. Am. Chem. Soc.*, 127, pp. 12784-12785 (2005), both of which are herein incorporated by reference in their entirety.

When the ionic liquid is a protic ionic liquid, the protic ionic liquid can be prepared by any suitable method, including methods known in the art. A general reference for the preparation, purification, and testing of protic ionic liquids is found in T. L. Greaves, et al., *Chem. Rev.*, 108, pp. 206-237 (2008), which is herein incorporated by reference in its entirety. In a particular embodiment, the ionic liquids described herein are prepared by direct reaction of an acid HA and a base B in a suitable solvent, such as a water or wateralcohol solvent. In another embodiment, particularly when HA is a superacid, the ionic liquids described herein are prepared in a two-step process wherein the superbase B is first reacted with a strong acid HA' (e.g., a mineral acid) to form the species $BH^+A'$, and then the species $BH^+A'$ is reacted with a salt of the superacid (i.e., $M^+A^-$, wherein M is a metal, such as an alkali metal) to form $BH^+A^-$ along with $M^+A'$. Typically, particularly when an aqueous phase is utilized, the ionic liquid is less soluble than the salt byproduct in water, and therefore, settles out of the solution as a separate phase, thereby making separation possible by use of, for example, a separatory funnel. Because the ionic liquid is generally more dense than the solvent, the ionic liquid tends to form a lower phase while the salt byproduct is maintained in a solvent upper phase. After the ionic liquid is initially separated, the ionic liquid can be purified by any of the means known in the art (e.g., solvent washings and/or distillation). When the ionic liquid includes a superbase component, the superbase component (e.g., guanidino and phosphazeno classes of superbases) can be synthesized according to procedures known in the art, such as those described in A. A. Kolomeitsev, et al., *J. Am. Chem. Soc.*, 127, pp. 17656-17666 (2005), the full disclosure of which is herein incorporated by reference in its entirety.

The ionic liquids of the invention are naturally in a liquid state (i.e., fluids) typically at or below 100° C., and more typically, at or below 90° C., 80° C., 70° C., 60° C., 50° C., 40° C., or at or below room temperature (i.e., at or less than about 15, 20, 25, or 30° C.). In other embodiments, the ionic liquids are in liquid form at or below 0° C., −5° C., −10° C., −20° C., or −30° C. Preferably, the ionic liquid possesses a melting point that is at or below any of the temperatures given above. Although the invention primarily makes use of ionic liquids that are naturally fluids at or below room temperature, the invention also can make use of ionic liquids that are solid or semi-solid at about room temperature or above (or at 100° C. or above), but which can be rendered liquids at a higher temperature by the application of heat. A higher melting ionic liquid may be advantageous in the case where the higher melting ionic liquid provides a better char yield or other favorable characteristic than a lower melting ionic liquid of similar structural design.

The density of the ionic liquid is generally above 1.2 g/mL at an operating temperature of interest, and particularly at a temperature within 20-30° C. In different embodiments, the density of the ionic liquid can be about, at least, or no more than, for example, 1.2, 1.3, 1.4, 1.5, 1.6, 1.7, or 1.8 g/mL, or a particular range bounded by any two of the foregoing exemplary values.

The viscosity of the ionic liquid is typically no more than about 50,000 centipoise (50,000 cP), particularly at a temperature within 20-30° C. In other embodiments, the viscosity of the ionic liquid can be about, at least, or no more than, for example, 25,000 cP, 10,000 cP, 5,000 cP, 2,000 cP, 1,000 cP, 800 cP, 700 cP, 600 cP, 500 cP, 400 cP, 300 cP, 200 cP, 120 cP, 100 cP, 50 cP, 40 cP, or 30 cP, or within a particular range bounded by any two of the foregoing exemplary values.

The conductivity of the ionic liquid is typically at least 0.01 mS/cm (0.001 S/m), particularly at a temperature within 20-30° C. In different embodiments, the conductivity of the ionic liquid can be about, at least, or no more than, for example, 0.01, 0.05, 0.1, 0.2, 0.3, 0.4, 0.5, 1.0, 2.0, 3.0, 4.0, 5.0, 6.0, 7.0, 8.0, 9.0, 10.0, 11.0, or 12.0 mS/cm, or within a particular range bounded by any two of the foregoing exemplary values.

The ionic liquids described herein can also be combined with each other and/or with one or more conventional ionic liquids, i.e., ionic liquids that do not contain a C—N unsaturated bond or group. The conventional ionic liquid can be, for example, any of the imidazolium-based ionic liquids known in the art (e.g., 1-butyl-3-methylimidazolium, i.e., (BMIM) ionic liquids that contain an anion lacking a C—N unsaturated bond, such as [BMIM][Tf$_2$N]), and/or any of the N-alkylpyridinium-based ionic liquids known in the art, and/or any of the ammonium-based ionic liquids known in the art (e.g., [Et$_3$NH][Tf$_2$N], where Et indicates ethyl), and/or any of the phosphonium-based ionic liquids known in the art, and/or piperidinium-based ionic liquids known in the art, and/or pyrrolidinium-based ionic liquids known in the art, and/or sulfonium-based ionic liquids known in the art. The inclusion of one or more conventional ionic liquids may serve to modify, adjust, or optimize one or more properties or characteristics of the ionic liquid, such as melting point, density, viscosity, conductivity, chemical, or catalytic properties. In other embodiments, one or more particular classes or compositions of conventional ionic liquids are excluded from the ionic liquid composition.

In one embodiment, at least one of the above-described ionic liquids is admixed with one or more solvents. The solvent typically functions as a casting or film-forming solvent. The solvent can be, for example, a polar protic solvent, polar aprotic solvent, or a non-polar solvent. Some examples of polar protic solvents include the alcohols containing up to four linked carbon atoms (e.g., methanol, ethanol, isopropanol, n-butanol, t-butanol), dials (e.g., ethylene glycol, diethylene glycol, triethylene glycol), and protic amines (e.g., ethylenediamine, ethanolamine, diethanolamine, triethanolamine). Some examples of polar aprotic solvents include the nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), dialkylcarbonates (e.g., ethylene carbonate, dimethylcarbonate, diethylcarbonate), organoethers (e.g., diethyl ether, tetrahydrofuran, and dioxane), HMPA, NMP, and DMPU. As used herein, a "non-polar solvent" is a solvent containing a linkage of at least five carbon atoms. Accordingly, some examples of non-polar solvents include n-pentanol, n-hexanol, a pentane, hexane, heptane, octane, pentene, hexene, heptene, octene, or an aromatic solvent, such as benzene, toluene, or a xylene. In different embodiments, the solvent can be included in an amount of, or at least, or less than, for example, 0.1 wt %, 0.5 wt %, 10 wt %, 20 wt %, 30 wt %, 40 wt %, 50 wt %, 60 wt %, 70 wt %, 80 wt %, 90 wt % (by total weight of the ionic liquid, solvent, and any other components), or within a range bounded by any of the foregoing exemplary values.

In other embodiments, one or more of any of the foregoing classes of solvents, or specific solvents, is excluded. For example, in some embodiments, it may be preferable to exclude solvents having a boiling point over 25° C., 50° C., or 100° C. In other embodiments, it may be preferable to exclude solvents having a boiling point under 25° C., 50° C., or 100° C. In yet other embodiments, it may preferable to include only one or more solvents in which the ionic liquid is substantially soluble, or partially soluble, or substantially insoluble (e.g., as separate phases). In a particular embodiment, all solvents are excluded.

In one set of embodiments, the ionic liquid contains or is admixed with a certain amount of water, e.g., about, at least, or no more than 1%, 2%, 3%, 4%, 5%, 6%, 7%, 8%, 9%, or 10% of water. In another set of embodiments, the ionic liquid is substantially devoid of water. For example, in some embodiments, it is desirable that the ionic liquid contains less than 1% by weight of water, or less than 0.5%, 0.1%, 0.01%, or even less than 0.001% by weight of water. The ionic liquid can be rendered substantially dry by, for example, subjecting the ionic liquid to reduced pressure conditions (i.e., less than 1 atm) at an elevated temperature (e.g., 60, 70, 80, 90, or 100° C.), typically for several hours (e.g., 3-48 hours).

In the method of the invention, a porous carbon film is produced by carbonizing one or a combination (i.e., mixture or solution) of any of the ionic liquids described above. Typically, the ionic liquid is rendered as a film on a substrate. A film of the ionic liquid can be prepared by any of the means known in the art. For example, a film can be prepared by casting the ionic liquid, either alone or admixed with a casting solvent, onto a desired substrate (by, for example, painting, spraying, dip coating, or spin coating). If a solvent is included, typically, the initially casted film is heated (i.e., in a calcination step) to remove the casting solvent, thereby solidifying the layer. If a solvent is not included, the initially casted film may or may not be subjected to a heating step (e.g., to remove contaminating residues, or to effect crosslinking) prior to the carbonization step. The heating step before carbonization is generally conducted at a lower temperature and/or for a shorter time period than for the carbonization step.

The film of the ionic liquid (i.e., before it is carbonized) can have any suitable thickness. For example, in different embodiments, the film can have a thickness of about, precisely, at least, or no more than 0.1, 0.25, 0.5, 1, 2, 3, 4, 5, 10, 20, 30, 40, 50, 60, 70, 80, 90, 100, 120, 140, 160, 180, or 200 microns, or a thickness within a range bounded by any two of the foregoing values. The resulting carbon film may also possess any of the foregoing exemplary thicknesses. The thickness may also be uniform. Typically, the substrate is constructed of (or includes) a refractory material, such as silicon, aluminum, or a combination thereof, or their oxides, nitrides, and carbides. Oxides, nitrides, phosphides and arsenides of boron, gallium, indium, tin, or a combination thereof, may also be used as a substrate. Any of the transition metal oxides, and in particular, oxides of the early transition metals (e.g., yttrium, zirconium, and hafnium), can be also be used as a substrate.

In other embodiments, the ionic liquid is incorporated into the pores of a porous support or matrix material before being subjected to a carbonization step. Depending on the desired application, the support or matrix material can be an inert (i.e., non-reactive) material, or alternatively, a chemically reactive or physically active material. The support or matrix material can have any suitable characteristics, such as being flexible or rigid, and malleable or non-malleable. Generally, carbonization of the IL-impregnated support or matrix material results in a support or matrix material containing a porous carbon material in interstices and/or pores of the support or matrix material.

In some embodiments, before the carbonization step, the ionic liquid is combined with one or more types of small molecules (i.e., non-polymer molecules having a weight typically of less than 1,000 g/mol). The small molecules are typically organic, and more typically, not highly volatile (e.g., having boiling points of at least 50, 60, 70, 80, 90, or 100° C.). The small molecules may, for example, improve the carbon yield or have a beneficial effect in the porosity, hardness, pore size, or pore arrangement of the resulting carbon film. In particular embodiments, the small molecule is non-ionic. In further embodiments, the small molecule may be mainly non-polar (e.g., a hydrocarbon compound), or polar (e.g., a hydrocarbon compound containing one or more of any of the polar heteroatom groups described above). Some examples of polar small molecules include phenolic molecules (e.g., phenol, resorcinol, and trihydroxybenzene), polyhydroxy compounds (e.g., ethylene glycol, diglycols, triglycols, and glycol ethers), polyamino compounds (e.g., ethylenediamine, diethylenetriamine, and the like), and carbonyl-containing compounds (e.g., benzophenone).

In some embodiments, the small molecule is selected based on its ability to crosslink either reactively (e.g. by covalent bond) or associatively (e.g., hydrogen bond or ionic bond). In a particular set of embodiments, the crosslinking molecules include metal atoms that form a metal-ligand (or dative) bond with metal-binding groups of the ionic liquid. Some examples of metal-binding groups include nitrile, amino, phosphino, phosphazeno, carbonyl, and/or carboxylate groups. The metal-binding groups can be in the cationic, or anionic, or both portions of the ionic liquid. Some examples of metal-containing crosslinking molecules include transition metal complexes (particularly, the noble metals) of the halides (e.g., fluorides, chlorides, bromides, or iodides), carboxylates, alkoxides, amines, and chelating (i.e., multidentate) ligands. Some examples of suitable transition metals include the first row transition metals (e.g., Ti, V, Cr, Mn, Fe, Co, Ni, Cu, Zn), second row transition metals (e.g., Zr, Ru, Rh, Pd, Ag, Cd), and third row transition metals (e.g., W, Pt, and Au).

The ionic liquid and small molecule can be combined in any suitable weight ratio. For example, in different embodiments, the weight ratio of ionic liquid to small molecule is preferably about 5:95, 10:90, 20:80, 30:70, 40:60, 50:50, 60:40, 70:30, 80:20, 90:10, or 95:5, or within a range bounded by any two of the foregoing values.

The ionic liquid is then carbonized by subjecting the ionic liquid film to carbonizing conditions in a carbonization step. The carbonization step includes any of the conditions, as known in the art, which cause carbonization of the precursor composition. Generally, in different embodiments, the carbonization temperature can be about, at least, or no more than 300° C., 350° C., 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., 1450° C., 1500° C., 1600° C., 1700° C., or 1800° C., or at a temperature within a particular range bounded by any two of the foregoing temperatures. The amount of time that the ionic liquid is subjected to the carbonization temperature (i.e., carbonization time) is highly dependent on the carbonization temperature employed. Generally, the higher the carbonization temperature employed, the shorter the amount of time required. In different embodiments, depending on the carbonization temperature and other factors (e.g., pressure), the carbonization time can be, for example, about, at least, or no more than 0.5, 1, 2, 3, 4, 5, 6, 7, 8, 9, 10, 11, or 12 hours, or within a range therein. In particular embodiments, it may be preferred to gradually raise the temperature at a set or varied temperature ramp rate (e.g., 5° C./min, 10° C./min, or 20° C./min). In other embodiments, it may preferred to subject the ionic liquid to a sudden (i.e., non-gradual) carbonization temperature. In some embodiments, after the ionic liquid film is subjected to a desired carbonization temperature for a particular amount of time, the temperature is reduced either gradually or suddenly.

If desired, the precursor composition, or alternatively, the carbonized material, can be subjected to a temperature high enough to produce a graphitized carbon material. Typically, the temperature capable of causing graphitization is a temperature of or greater than about 2000° C., 2100° C., 2200° C., 2300° C., 2400° C., 2500° C., 2600° C., 2700° C., 2800° C., 2900° C., 3000° C., 3100° C., or 3200° C., or a range between any two of these temperatures.

Typically, the carbonization or graphitization step is conducted in an atmosphere substantially absent of a reactive gas (e.g., oxygen or hydrogen), and typically under an inert atmosphere. Some examples of inert atmospheres include nitrogen ($N_2$) and the noble gases (e.g., helium or argon). The inert gas is generally made to flow at a specified flow rate, such as 50, 75, 100, 125, 150, 175, or 200 mL/min.

The pressure employed in the carbonization (or graphitization) step is typically ambient (e.g., around 1 atm). However, in some embodiments it may preferred to use a higher pressure (e.g., above 1 atm, such as 2, 5, 10, 20, 50, or 100 atm, or within a range therein). In other embodiments, it may be preferred to use a lower pressure (e.g., below 1 atm, such as 0.5, 0.1, 0.05, or 0.01 atm, or within a range therein). In other embodiments, it may be preferred to include at least one reactive gas, such as oxygen, hydrogen, ammonia, carbon dioxide, and/or methane. The one or more reactive gases may, for example, desirably change or adjust the compositional, structural, or physical characteristics of the carbon film.

The pores of the porous carbon film can be of any particular size, including mesopores, micropores, or macropores, or a combination thereof. In particular embodiments, the carbon film is a mesoporous carbon film. A mesoporous carbon film contains pores within the size range of 2-50 nm (i.e., mesopores). In some embodiments, the carbon material possesses mesopores in the substantial absence of micropores (pores of less than 2 nm in size) and/or macropores (pores of more than 50 nm in size). In other embodiments, the carbon material is mainly microporous, and in further embodiments, may contain micropores in the substantial absence of mesopores and/or macropores. By a "substantial absence" of micropores, mesopores, or macropores is meant that no more than 5%, and more preferably, no more than about 1%, 0.5%, or 0.1% of the total pore volume is due to the presence of, respectively, micropores, mesopores, or macropores. In different embodiments, the carbon material preferably possesses mesopores having a size (diameter) of about 2, 3, 4, 5, 6, 7, 8, 9, 10, 12, 15, 20, 25, 30, 35, 40, 45, or 50 nm, or a size within a range bounded by any two of these values.

The pores of the carbon material can also possess a degree of uniformity, e.g., in pore diameter and/or pore shape. For example, in different embodiments, the pores of the carbon material may possess an average pore diameter corresponding to any of the diameters exemplified above, subject to a degree of variation of no more than, for example, ±10 nm, ±8 nm, ±6, nm, ±5 nm, ±4 nm, ±3 nm, ±2 nm, or ±1 nm. The wall thickness of the pores can be, for example, within a range of about 5.0-7.0 nm, e.g., 5.0, 5.5, 6.0, 6.5, or 7.0 nm, or a range between any two of these values. The pores can also be arranged relative to each other with a certain degree of order (i.e., in a patterned or ordered arrangement). Some examples of ordered arrangements include a hexagonal or cubic arrangement.

In addition, the longitudinal dimension of the pores can have a particular orientation with respect to the surface, particularly for the case of a film. For example, in one embodiment, it is preferred for the longitudinal dimension of the pores to be oriented either completely perpendicular to the surface (i.e., precisely 90°), or substantially perpendicular to the surface, e.g., 90±10° (i.e., 80° to −80°), 90±5°, 90±2°, or 90±1' with respect to the surface. An orientation of pores substantially perpendicular to the surface is particular advantageous for the case when the carbon material (typically, a film or membrane) is applied as a gas-permeable material. In another embodiment, it may be preferred for a substantial portion of pores to have a longitudinal dimension oriented obliquely to the surface within a range of angles of, e.g., 45° to −45°, 60° to −60°, 70° to −70°, or 80° to −80°, with respect to the surface. In yet another embodiment, it is preferred for the longitudinal dimension of the pores to be oriented either completely aligned (i.e., parallel) with the surface (i.e., precisely) 0°, or substantially aligned to the surface, e.g., 0±10°, 0±5', 0±2°, or 0±1' with respect to the surface. A selected orientation of pores can be accomplished by, for example, carbonizing a block of precursor material and then slicing or etching a selected surface having a desired angle with respect to the longitudinal dimensions of the pores. A selected orientation of pores may also be accomplished by, for example, adjusting the angle of the carbon material and/or by compression by an overlayer during the carbonization step.

In different embodiments, the porous carbon material can possess a BET surface area of, for example, about, at least, or no more than 1, 2, 5, 10, 20, 30, 40, 50, 100, 200, 300, 400, 450, 500, 550, 600, 650, 700, 750, or 800 $m^2/g$, or a value within a range bounded by any two of these values. The porous carbon material typically possesses a pore volume of about, at least, or no more than 0.1, 0.2, 0.25, 0.3, 0.35, 0.4, 0.45, 0.5, 0.55, 0.6, 0.65, or 0.7 $cm^3/g$, or a value within a range bounded any two of these values.

The porous carbon material produced according to the method described above preferably possesses a high physical resilience, which can be manifested, for example, as a high thermal stability and resistance to cracking. A high thermal stability is preferably evidenced by a substantial absence of structural shrinkage, and/or a substantial preservation of mesoporosity, and/or a substantial preservation of the BET surface area after being heat-treated at a temperature of at least 1800° C. In more preferred embodiments, the high thermal stability is evidenced after heat treating the mesoporous carbon material at a temperature of at least 1850° C., 1900° C., 1950° C., 2000° C., 2050° C., 2100° C., 2150° C., 2200° C., 2250° C., 2300° C., 2350° C., 2400° C., 2450° C., 2500° C., 2550° C., 2600° C., 2650° C., or 2700° C., or a range between any two of the foregoing values. A "substantial absence of structural shrinkage" and a "substantial preservation of BET surface area" as used herein generally means that either of these parameters change by no more than about 5%, and more preferably, no more than about 1%, 0.5%, or 0.1% after heat treatment as compared to the original value before heat treatment. The carbon material can also possess a substantial preservation of mesoporosity, which, as used herein, generally means that the pore volume due to micropores or macropores does not increase by more than about 5%, and more preferably, no more than about 1%, 0.5%, or 0.1%, as compared to the total pore volume, after a heat treatment step (as described above).

Generally, the carbon material produced according to the method described herein also contains nitrogen. The amount of nitrogen is typically at least 1 atom %. In different embodiments, the nitrogen content can be, for example, about, at least, or no more than 1, 2, 3, 4, 5, 6, 7, 8, 9, 10, 11, 12, 15, 18, 20, 22, 25, or 30 atom %, or within a range bounded by any two of these values. In particular embodiments, the nitrogen is included in the carbon material in an atomically-ordered arrangement, such as within interconnected aromatic rings, such as triazine rings. However, a carbon material with such an ordered nitrogen arrangement can, in some embodiments, be used as an ordered intermediate in which further heating at a higher temperature produces a final carbon material with an ordered arrangement of pores.

Examples have been set forth below for the purpose of illustration and to describe certain specific embodiments of the invention. However, the scope of this invention is not to be in any way limited by the examples set forth herein.

Example 1

Preparation of Ionic Liquids (ILs)

Figure 2:
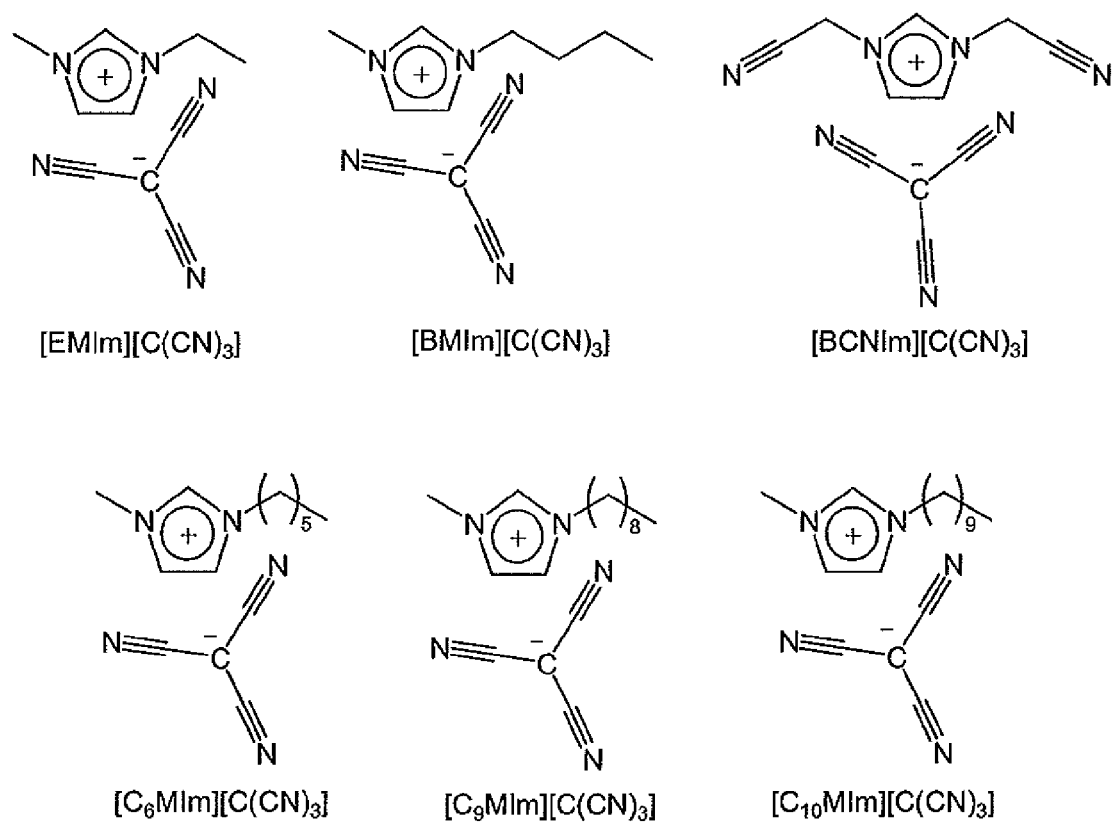
FIG. 2. Chemical structures of some exemplary ionic liquid carbon precursors of the invention, where EMIm=ethylmethylimidazolium, BMIm=butylmethylimidazolium, BCNIm=bis(cyanomethyl)imidazolium, $C_6$MIm=hexylmethylimidazolium, $C_9$MIm=nonylmethylimidazolium, and $C_{10}$MIm=decylmethylimidazolium.
Figure 3:
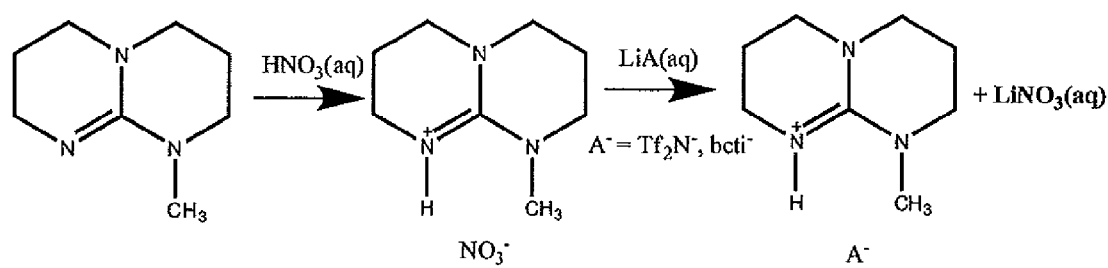
FIG. 3. Scheme showing a general method for preparation of cyclic guanidinium ionic liquids of the invention.

The ionic liquids depicted in FIGS. 1 and 2 were prepared as exemplary ionic liquid carbon precursors. Many of the ionic liquids could be synthesized by a single pot synthesis. For example, referring to the ionic liquid [MTBDH][Tf$_2$N] for illustration only (see FIG. 3), MTBD (pK$_a$(BH$^+$)=25.4) was initially dissolved in water and chilled in an ice bath, followed by careful titration with 10.6 N HNO$_3$ to form aqueous [MTBDH][NO$_3$]. Anion exchange was achieved by adding one equivalent of LiTf$_2$N in water, resulting in spontaneous segregation of the dense, lower [MTBDH][Tf$_2$N] phase. After careful washing with double distilled water several times, rotary evaporation resulted in a nearly colorless free-flowing PIL in nearly quantitative yield. In this case, following vacuum drying at 70° C. overnight, [MTBDH][Tf$_2$N] contained about 110 ppm water (as determined by Karl-Fischer Coulometric titration) and showed a room temperature ionic conductivity ($\sigma$) of 1.49 mS·cm$^{-1}$.

Another example is provided by the synthesis of the ionic liquid [C$_6$MIm][C(CN)$_3$]. In this synthesis, [C$_6$MIm][Br] was first initially dissolved in D.I. water. To this solution was added potassium tricyanomethanide [KC(CN)$_3$]-D.I. water solution dropwise. The resulting mixture was stirred at room temperature for 1-2 hours until two phases were formed. The lower phase, which contains the [C$_6$MIm][C(CN)$_3$] phase, was separated from the upper aqueous phase. The upper aqueous phase was extracted with ethyl acetate twice. The resulting organic phase containing ethyl acetate was combined with the [C$_6$MIm][C(CN)$_3$] phase. The solvent was then evaporated by rotary evaporation to give the pure ionic liquid compound [C$_6$MIm][C(CN)$_3$] as a pale yellow liquid.

Example 2

Production of Porous Carbon Films

Figure 11:
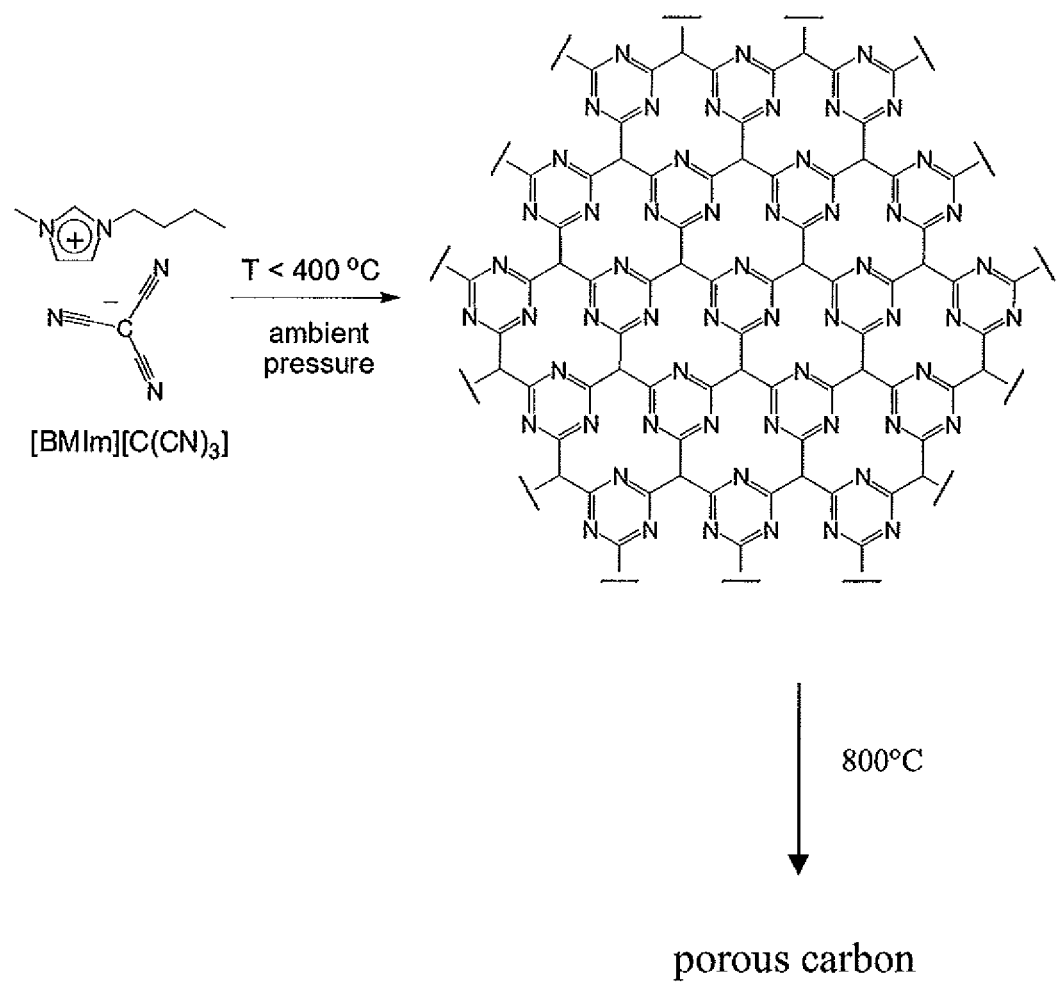
FIG. 11. Reaction scheme of the trimerization of nitrile-containing anion, leading to the formation of an extended framework.

The carbonization of ILs was carried out by adding 0.5 g of each IL to an alumina crucible and placing the crucible inside a quartz tube furnace. The temperature was increased at a rate of 10° C. min$^{-1}$ up to 800° C. under a N$_2$ carrier gas flowing at 100 mL min$^{-1}$. After heat treatment for 1 hour, the furnace was cooled to room temperature. By the method described herein, formation of carbon materials can proceed at low temperature (e.g., 300-500° C., or about 400° C.) and ambient pressure via formation of triazines (see FIG. 11).

Figure 4:
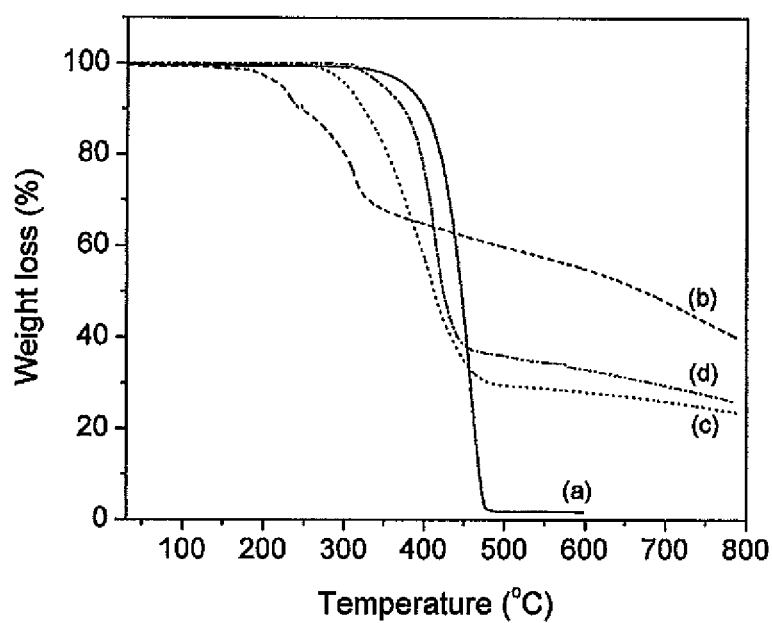
FIG. 4. Thermogravimetric analysis (TGA) of (a) [BMIm]$Tf_2N$, (b) [BCNIm]Cl, (c) [BCNIm]$Tf_2N$, and (d) [BCNIm]BETI.

FIG. 4 compares the comparison of the thermal gravimetric curves of selected nitrile-functionalized ILs (i.e., (a) [BMIm]Tf$_2$N, (b) [BCNIm]Cl, (c) [BCNIm]Tf$_2$N, and (d) [BCNIm]BETI), where (a) is a conventional aprotic IL, i.e., 1-butyl-3-methyl-imidazolium bis(trifluoromethylsulfonyl)imide, and (b), (c), and (d) correspond, respectively, to 1,3-bis-(cyanomethyl)imidazolium salts of Cl, Tf$_2$N (bis(trifluoromethylsulfonyl)imide), and BETI (bis(pentafluoroethylsulfonyl)imide) anions. From these results, it is evident that the thermal stability of this class of ILs strongly depends on anions of ILs for the same cation. For example, whereas no carbon yield was achieved via direct carbonization of the conventional aprotic ILs, a significant carbon yield was observed for the nitrile-functionalized ILs. This observation clearly demonstrates the success of the instant strategy for synthesis of carbon via non-polymeric precursors.

Table 1 below shows the carbonization yield of the selected ILs. As shown, in the case of the chloride-based ILs, the di-nitrile-functionalized IL exhibits a carbonization yield as high as 53% (Table 1). The carbon yield for ILs with Tf$_2$N$^-$ and BETI as anions is less because of gasification of larger anions. These carbonization yields are close to those of the corresponding theoretical carbon yields.

TABLE 1

Properties of carbonized ionic liquids[a]

| Ionic Liquids | Yield of Carbonization (%) | BET Surface Area (m$^2$ g$^{-1}$) |
|---|---|---|
| [MTBDH]NO$_3$ | 15.9 | 16.4596 |
| [HTBDH]NO$_3$ | 12.1 | 19.0100 |
| [MPCNIm]N(CN)$_2$ | 31.1 | 13.0646 |
| [BMIm]N(CN)$_2$ | 14.0 | 8.8842 |
| [BMPyr]N(CN)$_2$ | 9.5 | 10.4000 |
| [BCNIm]Cl | 53.0 | 15.5139 |
| [BCNIm]Cl[b] | 81.9 | 0.0194 |
| [BCNIm]Cl/BMIm]Tf$_2$N (2/1) | 39.1 | 3.1877 |
| [BCNIm]Cl/[DMAcH]H$_2$PO$_4$ (1/1) | 30.0 | 182.3716 |
| [BCNIm]Tf$_2$N | 22.8 | 640.4315 |
| [BCNIm]Tf$_2$N[c] | 45.7 | 481.3978 |
| [BCNIm]BETI | 23.0 | 662.6598 |
| [BCNIm]H$_2$PO$_4$ | 36.5 | 155.3793 |
| [MCNIm]Cl | 42.0 | 4.6176 |
| [TCNPA]Tf$_2$N | 12.1 | 31.4668 |
| [MCNIm]Tf$_2$N | 16.8 | 780.6100 |
| [MTBDH]Tf$_2$N[d] | 9.0 | 464.7762 |
| [MTBDH]BETI[c] | 13.2 | 484.1289 |
| [MTBDH]H$_2$PO$_4$ | 20.5 | 4.2903 |

[a]Carbonization condition: temperature = 800° C., heating rate = 10° C. min$^{-1}$, dwell time = 1 h, under N$_2$ (g).
[b]At 350° C. for 3 h.
[c]At 400° C. for 2 h.
[d]At 450° C. for 2 h.

Figure 5:
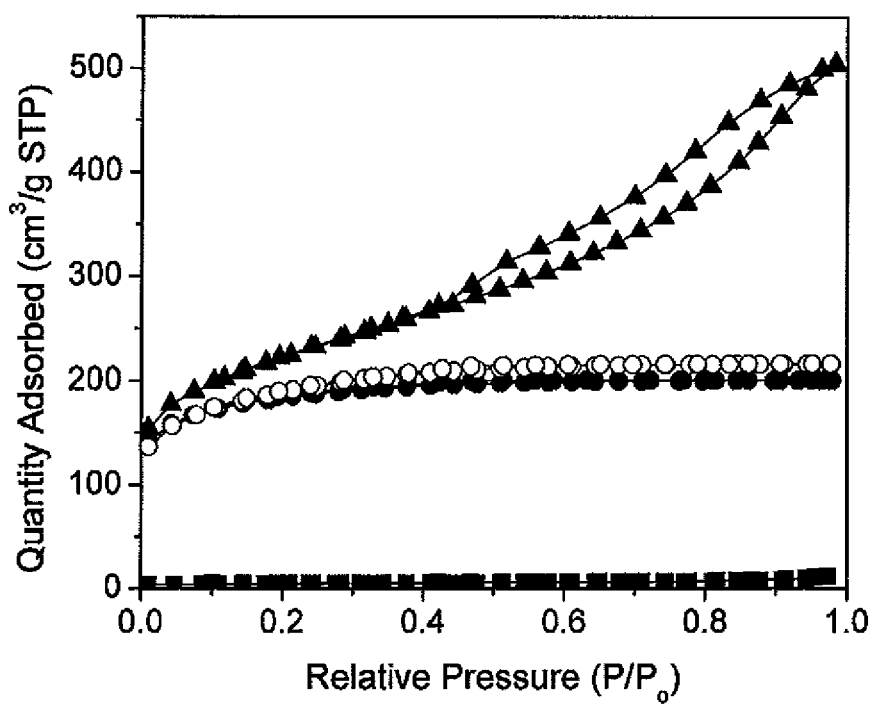
FIG. 5. Nitrogen sorption isotherms of (■) [BCNIm]Cl, (●) [BCNIm]$Tf_2N$, (○) [BCNIm]BETI, and (▲) [MCNIm]$Tf_2N$.
Figure 6:
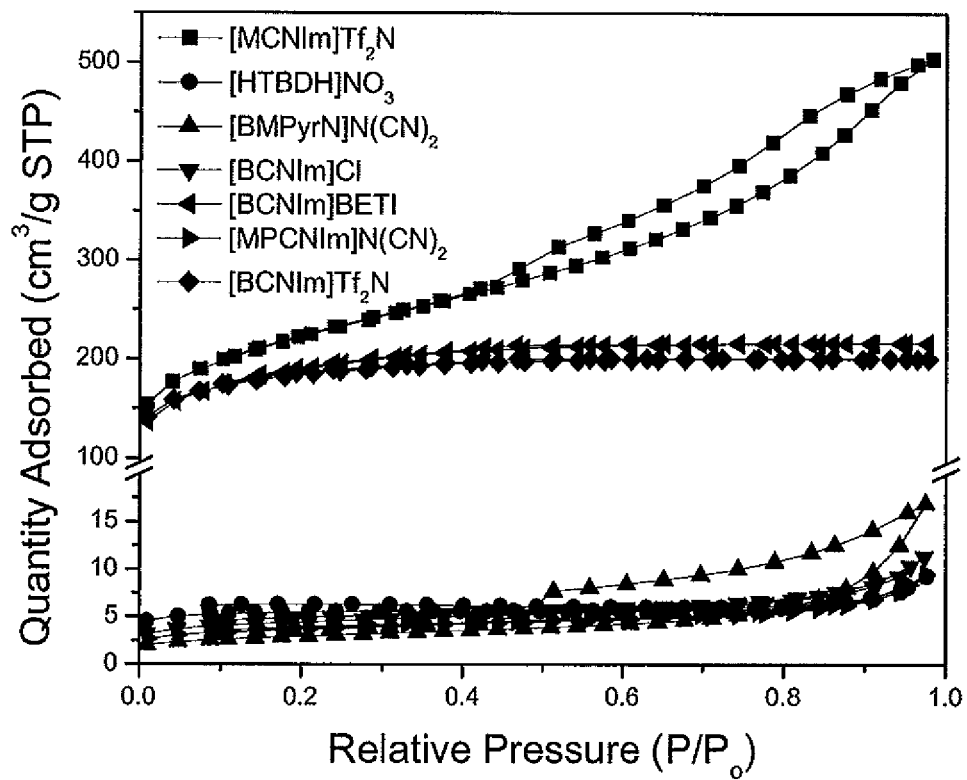
FIG. 6. Nitrogen sorption isotherms of several other carbonized ILs.

The BET N$_2$-adsorption isotherms of carbons derived from ILs at 850° C. are shown in FIGS. 5 and 6. Interestingly, the anion structures of these char-forming ILs have a significant influence on the surface areas of the resulting carbon materials. The carbon materials derived from bulky anions possess a high surface area, thus suggesting a templating role played by anions to generate micropores. By switching the anion from Tf$_2$N$^-$ to chloride, the BET surface area was decreased to 15.5 m$^2$ g$^{-1}$. The cation structures can also impact pore structures and surface areas. While [MCNIm]Tf$_2$N exhibits a type IV isotherm with an associated H$_2$ type hysteresis indicating the presence of mesoporosity, no significant mesoporosity is present in the carbon materials derived from [BCNIm]Tf$_2$N. The fact that the mesopore structure can be generated without use of any mesoscopic templates is significant, and demonstrates further versatility of the synthetic methodology described herein.

Figure 7:
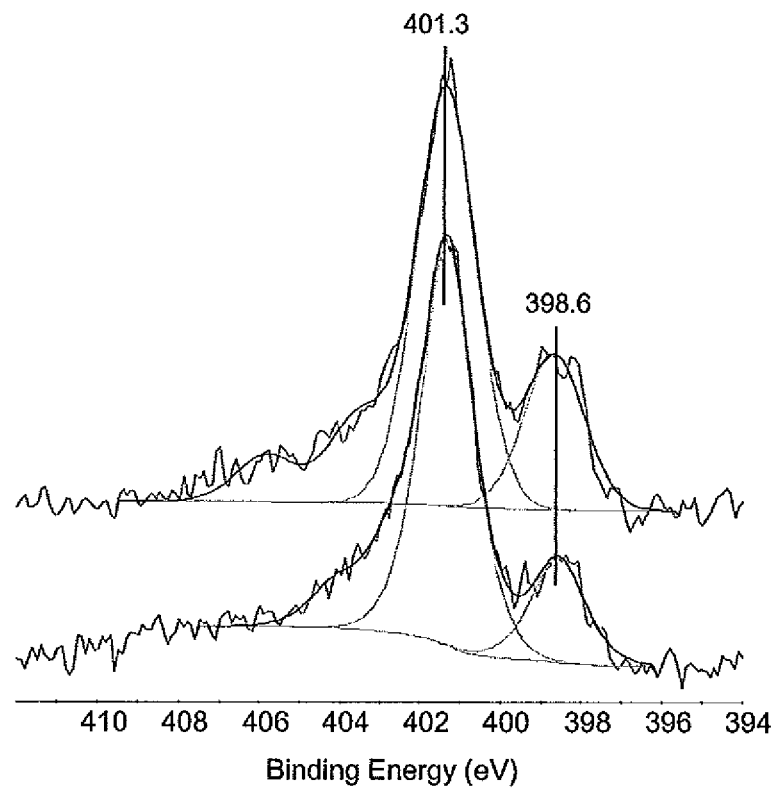
FIG. 7. X-ray photoelectron spectroscopy (XPS) spectra of [BCNIm]$Tf_2N$.

The XPS spectrum of the corresponding carbon derived from carbonization of [BCNIm]Tf$_2$N (as shown in FIG. 7) shows that the nitrogen content of this carbon is as high as 2.4 atom %. The high nitrogen content can be traced to the involvement of imidazolium rings and nitrile groups. The high nitrogen content can make these porous carbon materials particularly useful in sequestration of CO$_2$.

Figure 8:
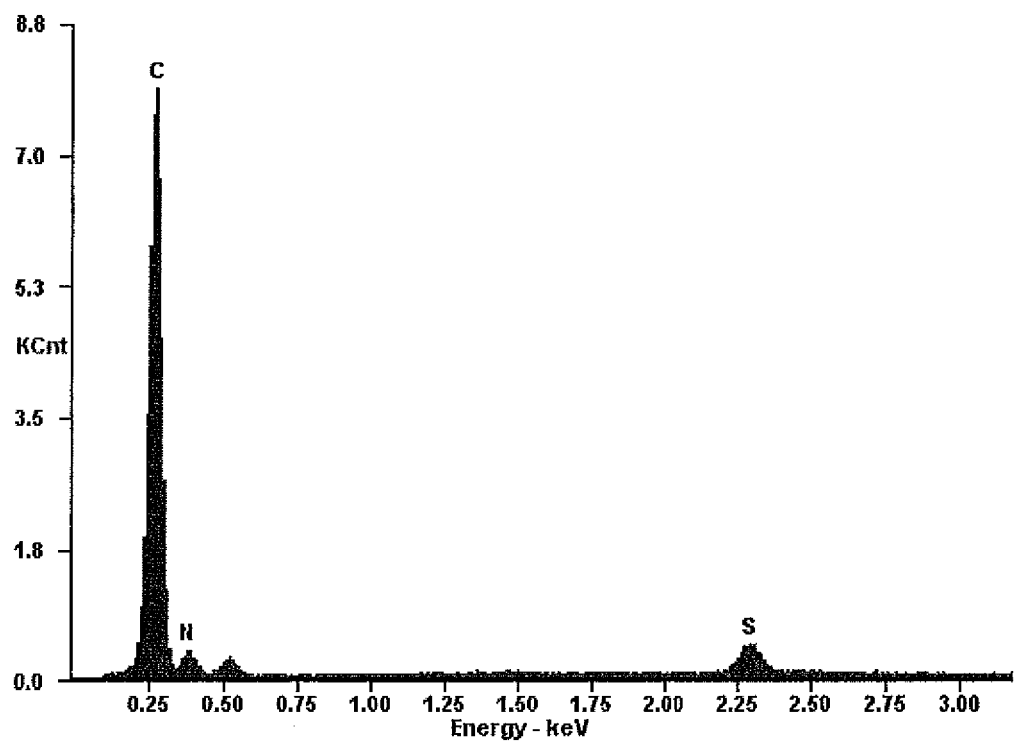
FIG. 8. Energy-dispersive X-ray spectroscopy (EDS) spectrum of [BCNIm]$Tf_2N$.

FIG. 8 shows the EDS analysis of elemental contents of the carbon material derived from [BCNIm]Tf$_2$N. The presence of nitrogen is evident by the nitrogen signal shown in the figure (labeled N). In addition, as shown by the peak labeled "S", this carbon material also contains sulfur.

Figure 9:
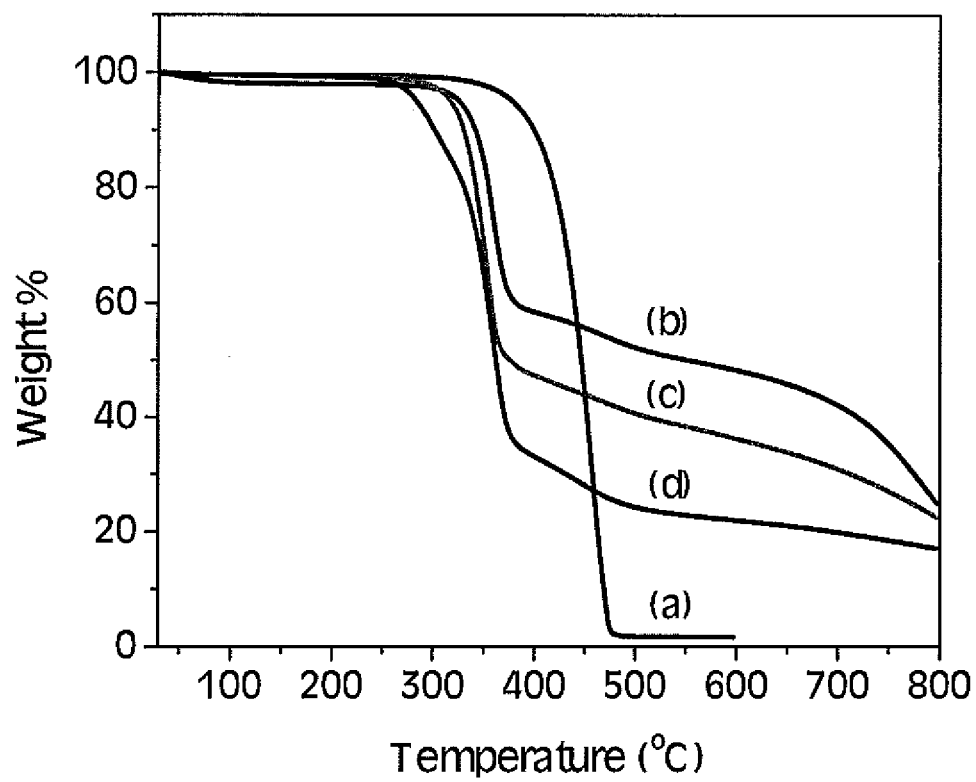
FIG. 9. Scanning thermogravimetric profiles of (a) [BMIm]$Tf_2N$, (b) [EMIm][C(CN)$_3$], (c) [BMIm][C(CN)$_3$], and (d) [$C_{10}$MIm][C(CN)$_3$] under flowing air (60 ml min$^{-1}$) with a ramp rate of 10° C. min$^{-1}$.
Figure 10:
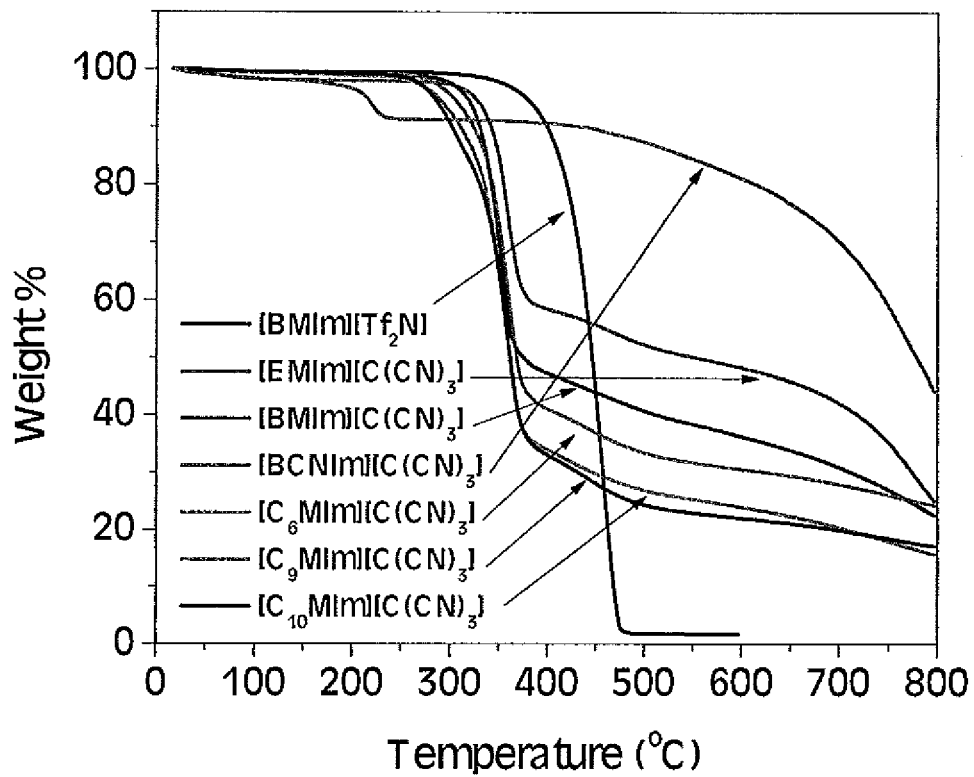
FIG. 10. Scanning thermogravimetric profiles of ILs under flowing air (60 ml min$^{-1}$) with a ramp rate of 10° C. min$^{-1}$.

FIG. 9 compares the thermal gravimetric curves of three selected ionic liquids containing nitrile-functionalized anions with that of a conventional aprotic IL, [BMIm]Tf$_2$N (Tf$_2$N=bis(trifluoromethylsulfonyl)imide). A significant carbon yield was achieved with the ILs containing nitrile-functionalized anions (FIG. 10), whereas virtually no carbon yield was observed via the direct carbonization of [BMIm]Tf$_2$N.

Table 2 (below) summarizes the carbonization yields of the exemplary nitrile-functionalized ionic liquids.

TABLE 2

Characteristics of Porous Carbons Prepared from Ionic Liquids[a]

| IL[b] | Carbonization Yield [%] | Theoretical Value [%][c] | Theoretical Value [%][d] | BET Surface Area [m$^2$ g$^{-1}$] |
|---|---|---|---|---|
| [EMIm][C(CN)$_3$] | 25.0 | 23.9 | 59.6 | 3.8 |
| [BMIm][C(CN)$_3$] | 22.5 | 20.1 | 62.9 | 64.8 |
| [BCNIm][C(CN)$_3$] | 44.2 | 20.3 | 55.7 | 56.6 |
| [C$_6$MIm][C(CN)$_3$] | 19.6 | 18.7 | 65.3 | 86.9 |
| [C$_9$MIm][C(CN)$_3$] | 15.2 | 16.0 | 68.2 | 71.9 |
| [C$_{10}$MIm][C(CN)$_3$] | 11.3 | 15.3 | 69.0 | 72.3 |

[a]Conditions: 800° C. under N$_2$ (g); heating rate = 10° C. min$^{-1}$; dwell time = 1 h.
[b]EMIm = 1-ethyl-3-methylimidazolium; BMIm = 1-butyl-3-methylimidazolium; BCNIm = 1,3-bis(cyanomethyl)imidazolium; C$_6$MIm = 1-hexyl-3-methylimidazolium; C$_9$MIm = 1-methyl-3-nonylimidazolium; C$_{10}$MIm = 1-decyl-3-methylimidazolium.
[c]Theoretical values of C % for each precursor IL.
[d]Theoretical values of C % for each precursor IL based on anion.

As shown by Table 2 above, the carbonization yields of the nitrile-functionalized ionic liquids are much lower than the corresponding theoretical values, with the exception of [BCNIm][C(CN)$_3$], which can be crosslinked via both cations and anions. This observation indicates that the carbonization mechanism involves a two-step process. The anions undergo the dynamic cyclotrimerization reaction (FIG. 11), which is followed by the decomposition of the corresponding IL cations. The corresponding carbon yields originate mainly from the IL anions. In fact, the carbonization yields generally match well with the theoretical values calculated based on the carbon contents of the anions. Accordingly, the ILs containing smaller cations (e.g., [EMIm][C(CN)$_3$]) give a higher carbonization yield at 800° C. than those containing larger cations.

The thermal properties of the exemplary nitrile-containing ionic liquids are summarized in Table 3 below.

TABLE 3

Thermal properties of nitrile-containing ILs

| IL[a] | T$_m$ (° C.)[b] | T$_{Decomp}$ (° C.)[c] |
|---|---|---|
| [EMIm][C(CN)$_3$] | −25.2,[d] −11.6 | 329.0, 724.5[f] |
| [BMIm][C(CN)$_3$] | NA | 309.7 |
| [BCNIm][C(CN)$_3$] | 110.2 | 212.1, 449.0,[g] 695.7[f] |
| [C$_6$MIm][C(CN)$_3$] | NA | 319.5 |
| [C$_9$MIm][C(CN)$_3$] | −44.0,[e] −7.5 | 310.7 |
| [C$_{10}$MIm][C(CN)$_3$] | 4.1 | 314.2 |

[a]EMIm = 1-ethyl-3-methylimidazolium; BMIm = 1-butyl-3-methylimidazolium; BCNIm = 1,3-bis(cyanomethyl)imidazolium; C$_6$MIm = 1-hexyl-3-methylimidazolium; C$_9$MIm = 1-methyl-3-nonylimidazolium; C$_{10}$MIm = 1-decyl-3-methylimidazolium.
[b]Melting temperature.
[c]Decomposition temperature.
[d]Glass transition temperature.
[e]Phase transition temperature.
[f,g]Partial decomposition of cross-linked structure.

Figure 12:
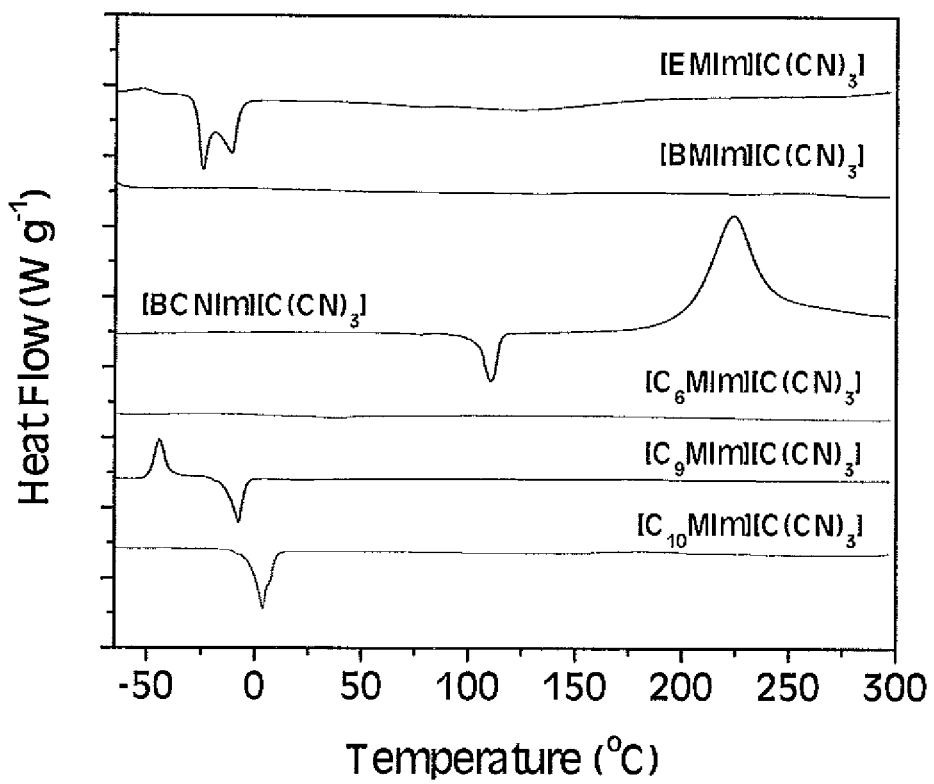
FIG. 12. Differential scanning calorimetric (DSC) profiles of ILs.

As shown by Table 3, most of the ILs have inching points below room temperature, with the exception of [BCNIm][C(CN)$_3$], which is a pale-brown powder at room temperature (see also FIG. 12). The decomposition temperatures for the exemplary ionic liquids are generally in the range of 309.7 to 329.0° C.

Figure 13:
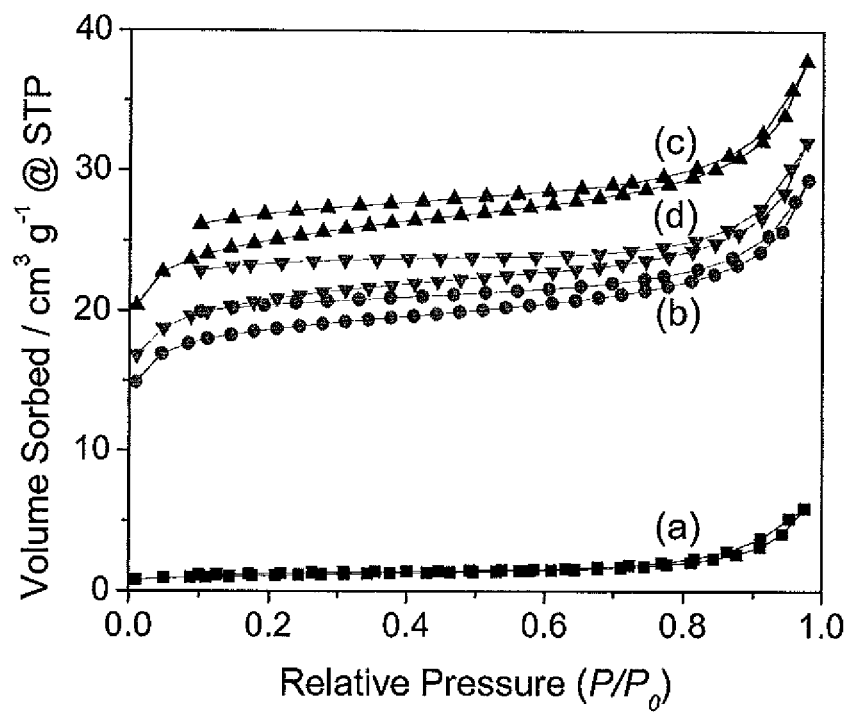
FIG. 13. Top: Nitrogen sorption isotherms of carbon materials derived from (a) [EMIm][C(CN)$_3$], (b) [BMIm][C(CN)$_3$], (c) [$C_6$MIm][C(CN)$_3$], and (d) [$C_{10}$MIm][C(CN)$_3$]. (Conditions: ramp rate=10° C. min$^{-1}$, temperature=800° C., dwell time=1 h). Bottom: Nitrogen sorption isotherms of carbon materials derived from various ILs, including the foregoing ILs (Conditions: ramp rate=10° C. min-1, temperature=800° C., dwell time=1 h).
Figure 13:
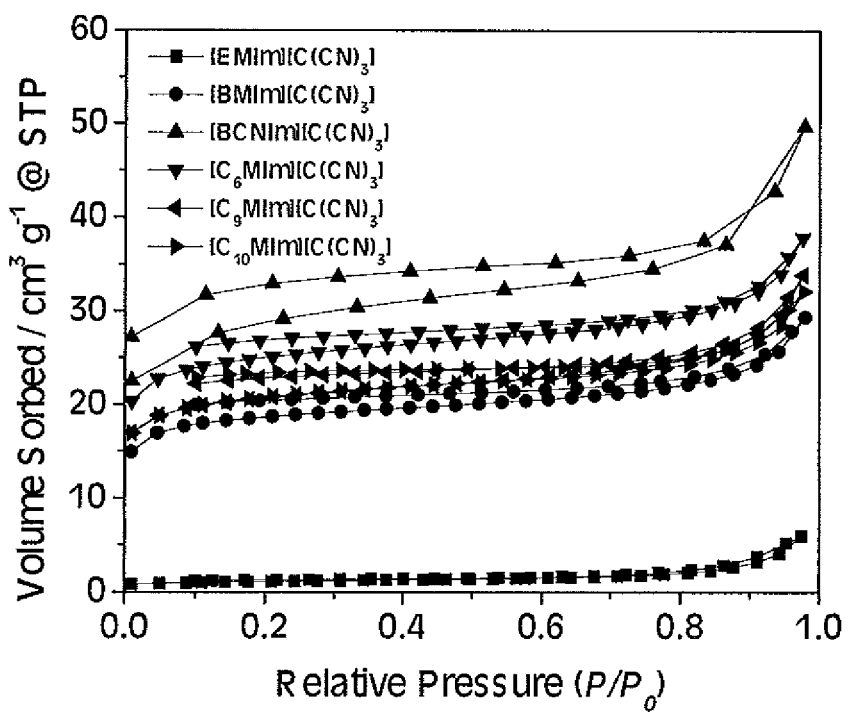

The BET N$_2$-adsorption-desorption isotherms for the carbons derived from various ILs at 800° C. are shown in FIG. 13. Interestingly, the cation structures of these char-forming ILs also exhibit a profound influence on surface areas. In general, carbonaceous materials obtained from ILs containing bulky cations give high surface areas, suggesting a templating role played by the IL cation during micropore generation (Table 2). For example, simply replacing [BMIm]$^+$ with [EMIm]$^+$ for a fixed anion results in a significant loss of porosity. The dependence of the carbon surface area on the alkyl group of the imidazolium cations appears more complicated. The surface area of carbon derived from [BMIm][C(CN)$_3$] is less than that from [C$_6$MIm][C(CN)$_3$] but greater than those from [C$_9$MIm] [C(CN)$_3$] and [C$_{10}$MIm][C(CN)$_3$].

The slight reduction of the surface areas of the carbon materials derived from the ILs containing the imidazolium cations with longer alkyl groups can be attributed to the partial collapse of pore structure during carbonization at high temperature. The carbon material derived from [BCNIm][C(CN)$_3$] has a slightly lower surface area than that derived from [BMIm][C(CN)$_3$]. This reduction could be due to the formation of a more condensed structure via crosslinking of both cations and anions. Hence, it has been shown that the instant invention can advantageously use not only non-carbonizable anions but also non-carbonizable cations for manipulation of carbon pore structures. The foregoing feature advantageously allows the instant method to tune various properties and characteristics of carbon materials by appropriate selection of cationic and anionic components of the ionic liquid. The properties and characteristics of the carbon material can be adjusted or optimized appropriately to suit a particular application.

Figure 14:
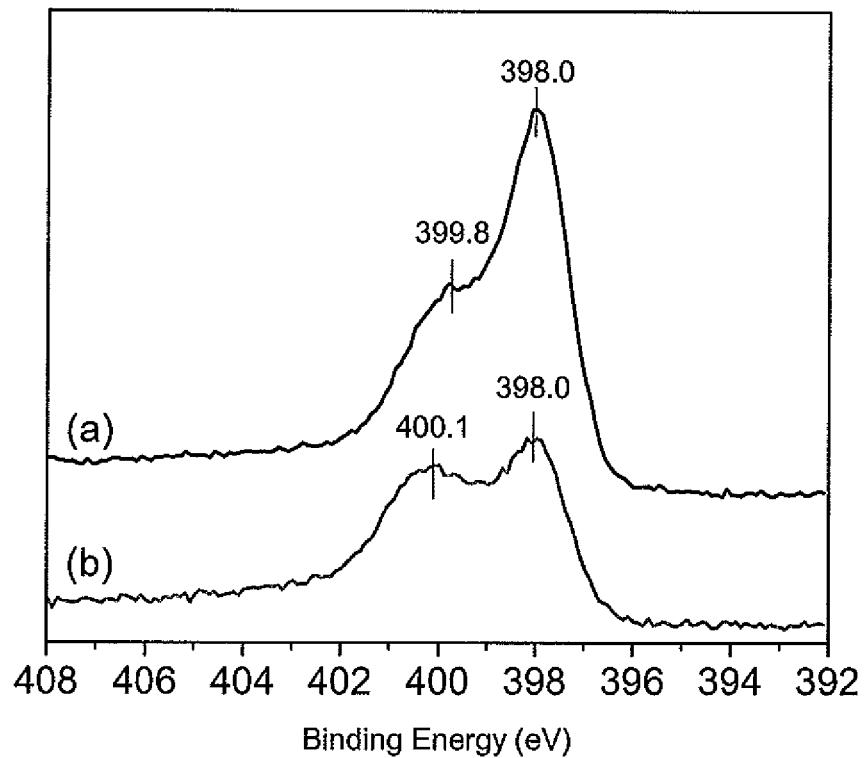
FIG. 14. X-ray photoelectron spectroscopy (XPS) N 1s narrow-scan spectra of carbonaceous materials derived from [$C_6$MIm][C(CN)$_3$] at (a) 400° C. for 2 h (N atomic %=22.9%) and (b) 800° C. for 1 h (N atomic %=13.3%).

FIG. 14 compares the X-ray photoelectron spectroscopy (XPS) spectrum of [C$_6$MIm][C(CN)$_3$]pyrolyzed at 400° C. with that of [C$_6$MIm][C(CN)$_3$]pyrolyzed at 800° C. Clearly, the nitrogen environments in the carbon material derived from 400° C. pyrolysis are dominated by a pyridinic structural feature. The content of this pyridinic structural unit decreases with the increasing pyrolytic temperature, indicating a concomitant rearrangement of carbon networks under high-temperature conditions. It should be noted that even in the carbon materials derived by high-temperature pyrolysis, the content of the pyridinic nitrogen is unexpectedly high. It is known that the pyridinic nitrogen in carbon materials is responsible for catalytic sites for oxygen reduction reaction (ORR). The method described herein based on char-forming anions in ILs opens up an alternative route towards advanced carbon materials with a high pyridinic nitrogen content.

Figure 15:
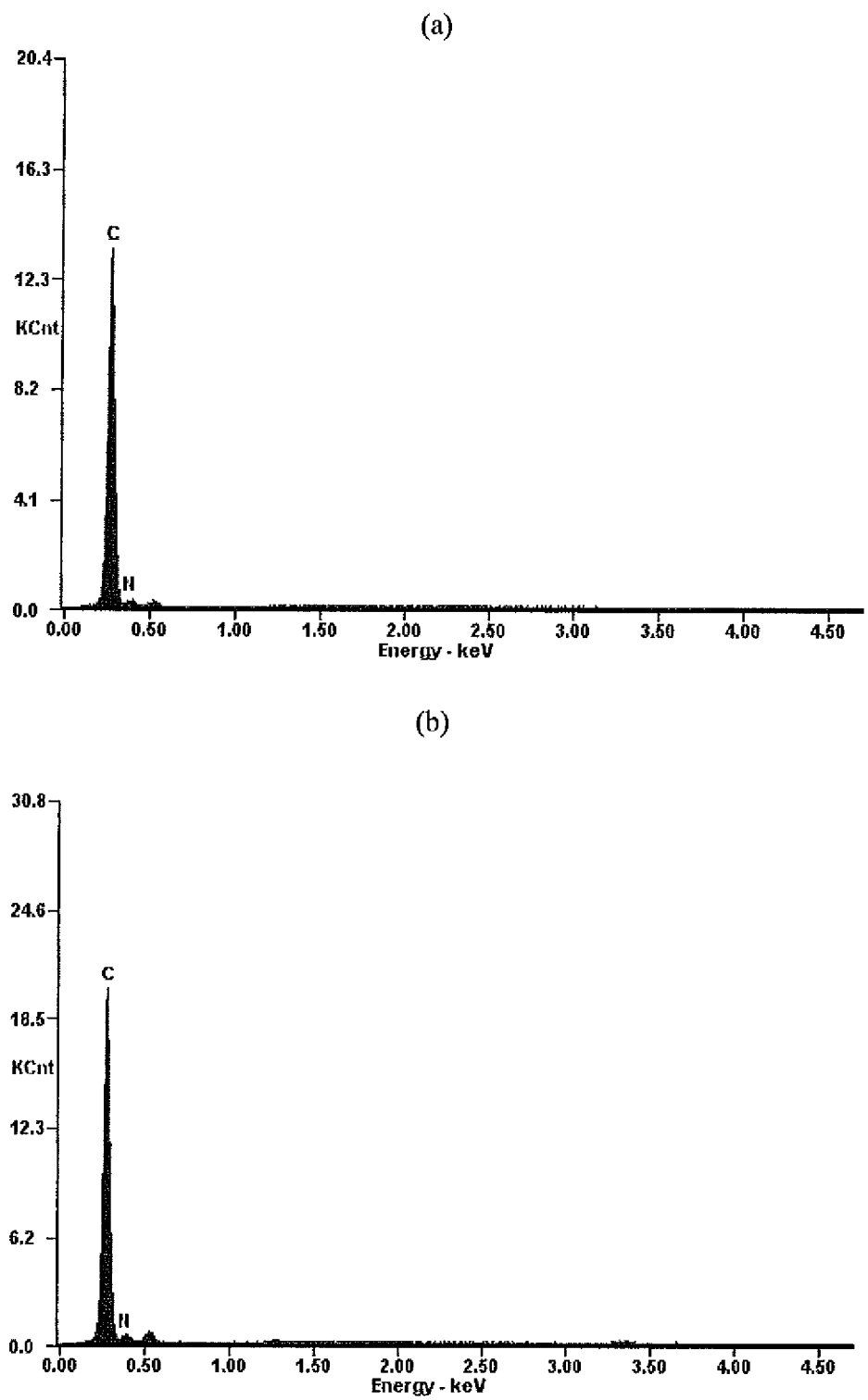
FIG. 15. EDS spectra of carbon materials derived from (a) [BMIm][C(CN)$_3$] and (b) [$C_6$MIm][C(CN)$_3$] (Conditions: ramp rate=10° C. min$^{-1}$, temperature=800° C., dwell time=1 h).

Energy-dispersive X-ray analysis (EDS) results for carbon materials derived from several exemplary carbon precursors are shown in FIG. 15. The results are summarized in Table 4 below.

TABLE 4

C/N ratio of carbonaceous materials derived from ILs[a,b]

| | Wt. % | | At. % | |
|---|---|---|---|---|
| ILs | C | N | C | N |
| [EMIm][C(CN)$_3$] | 80.1 | 19.9 | 82.4 | 17.6 |
| [BMIm][C(CN)$_3$] | 84.2 | 15.8 | 86.2 | 13.8 |
| [BCNIm][C(CN)$_3$] | 87.0 | 13.0 | 88.6 | 11.4 |
| [C$_6$MIm][C(CN)$_3$][c] | 70.6 | 29.4 | 73.7 | 26.3 |
| [C$_6$MIm][C(CN)$_3$] | 83.0 | 17.0 | 85.0 | 15.0 |
| [C$_6$MIm][C(CN)$_3$][d] | — | — | 86.7 | 13.3 |

TABLE 4-continued

C/N ratio of carbonaceous materials derived from ILs[a,b]

| | Wt. % | | At. % | |
|---|---|---|---|---|
| ILs | C | N | C | N |
| [C$_6$MIm][C(CN)$_3$][d,e] | — | — | 77.1 | 22.9 |
| [C$_9$MIm][C(CN)$_3$] | 83.6 | 16.4 | 85.6 | 14.4 |
| [C$_{10}$MIm][C(CN)$_3$] | 85.0 | 15.0 | 86.9 | 13.1 |

[a]Reaction condition: temperature = 800° C., ramp rate = 10° C. min$^{-1}$, dwell time = 1 h.
[b]Measured with EDAX.
[c]Calculated values.
[d]Measured with XPS.
[e]Reaction condition: temperature = 400° C., ramp rate = 10° C. min$^{-1}$, dwell time = 2 h.

The results shown in FIG. 15 and Table 4 reveal very high nitrogen contents (between 11.4 and 17.6 atom %), thus indicating that significant nitrogen functionalities still remain. This observation is consistent with the involvement of cyclotriazine building blocks during the formation of carbon networks.

While there have been shown and described what are at present considered the preferred embodiments of the invention, those skilled in the art may make various changes and modifications which remain within the scope of the invention defined by the appended claims.

What is claimed is:

1. A method for producing a film of porous carbon, the method comprising carbonizing a film of an ionic liquid, wherein said ionic liquid has the general formula $(X^{+a})_x(Y^{-b})_y$, wherein the variables a and b are, independently, non-zero integers, and the subscript variables x and y are, independently, non-zero integers, such that a·x=b·y, and at least one of X$^+$ and Y$^+$ possesses at least one carbon-nitrogen unsaturated bond.

2. The method according to claim 1, wherein said carbon-nitrogen unsaturated bond is provided by a nitrile group.

3. The method according to claim 2, wherein the X$^+$ portion of said ionic liquid includes a group with a positively charged nitrogen atom.

4. The method according to claim 3, wherein said group with a positively charged nitrogen atom is a nitrogen-containing ring.

5. The method according to claim 4, wherein said nitrogen-containing ring is an imidazolium ring.

6. The method according to claim 5, wherein the ionic liquid has the structural formula:

(2)

wherein R$^1$ and R$^2$ are independently selected from hydrogen atom and hydrocarbon groups, wherein said hydrocarbon group is optionally substituted with one or more heteroatoms and/or heteroatom groups, and Y$^-$ is a counteranion.

7. The method according to claim 6, wherein R$^1$ and R$^2$ are independently selected from hydrogen atom, hydrocarbon group, and nitrile-containing hydrocarbon group, provided that at least one of R$^1$ and R$^2$ is a nitrile-containing hydrocarbon group.

8. The method according to claim 7, wherein said nitrile-containing hydrocarbon group has the formula:

—(CH$_2$)$_n$—CN    (3)

wherein n is an integer of at least 1.

9. The method according to claim 7, wherein Y$^-$ contains at least one carbon-nitrogen unsaturated bond.

10. The method according to claim 4, wherein said nitrogen-containing ring is a pyrrolidinium ring.

11. The method according to claim 10, wherein the ionic liquid has the structural formula:

(4)

wherein R$^3$ and R$^4$ are independently selected from hydrogen atom, hydrocarbon group, and nitrile-containing hydrocarbon group, and Y$^-$ is a counteranion, provided that at least one of R$^3$ and R$^4$ is a nitrile-containing hydrocarbon group when Y$^-$ does not contain a carbon-nitrogen unsaturated bond, and provided that Y$^-$ contains at least one carbon-nitrogen unsaturated bond when both R$^3$ and R$^4$ are not nitrile-containing hydrocarbon groups.

12. The method according to claim 11, wherein R$^3$ and R$^4$ are independently selected from hydrogen atom, hydrocarbon group, and nitrile-containing hydrocarbon group, provided that at least one of R$^3$ and R$^4$ is a nitrile-containing hydrocarbon group, wherein Y$^-$ may or may not contain a carbon-nitrogen unsaturated bond.

13. The method according to claim 12, wherein said nitrile-containing hydrocarbon group has the formula:

—(CH$_2$)$_n$—CN    (3)

wherein n is an integer of at least 1.

14. The method according to claim 3, wherein said group with a positively charged nitrogen atom is an acyclic ammonium group.

15. The method according to claim 14, wherein the ionic liquid has the structural formula:

[NR$^5$R$^6$R$^7$R$^8$]$^+$[Y$^-$]    (5)

wherein R$^5$, R$^6$, R$^7$, and R$^8$ are independently selected from hydrogen atom, hydrocarbon group, and nitrile-containing hydrocarbon group, and Y$^-$ is a counteranion, provided that at least one of R$^5$, R$^6$, R$^7$, and R$^8$ is a nitrile-containing hydrocarbon group when Y$^-$ does not contain a carbon-nitrogen unsaturated bond, and provided that Y$^-$ contains at least one carbon-nitrogen unsaturated bond when none of R$^5$, R$^6$, R$^7$, and R$^8$ are nitrile-containing hydrocarbon groups.

16. The method according to claim 15, wherein R$^5$, R$^6$, R$^7$, and R$^8$ are independently selected from hydrogen atom, hydrocarbon group, and nitrile-containing hydrocarbon group, provided that at least one of R$^5$, R$^6$, R$^7$, and R$^8$ is a nitrile-containing hydrocarbon group, wherein Y$^-$ may or may not contain a carbon-nitrogen unsaturated bond.

17. The method according to claim 16, wherein said nitrile-containing hydrocarbon group has the formula:

—(CH$_2$)$_n$—CN    (3)

wherein n is an integer of at least 1.

18. The method according to claim 1, wherein said carbon-nitrogen unsaturated bond is provided by an imino-containing group.

19. The method according to claim 18, wherein said imino-containing group is in the X⁺ portion of the ionic liquid.

20. The method according to claim 19, wherein the X⁺ portion of the ionic liquid includes an imino-containing ring.

21. The method according to claim 20, wherein the ionic liquid has the structural formula:

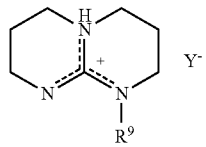

(6)

wherein $R^9$ is a hydrogen atom, hydrocarbon group, or nitrile-containing hydrocarbon group, and Y⁻ is a counteranion.

22. The method according to claim 1, wherein Y⁻ has the formula:

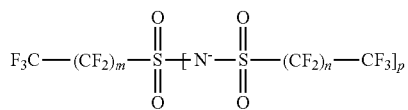

(7)

wherein m and n are independently 0 or an integer of 1 or above, and p is 0 or 1, provided that when p is 0, the group —N—SO₂—(CF₂)ₙCF₃ subtended by p is replaced with an oxide atom connected to the sulfur atom, and when p is 1, the shown perfluoroalkyl groups can optionally crosslink to form a cyclic anion.

23. The method according to claim 22, wherein Y⁻ has the formula:

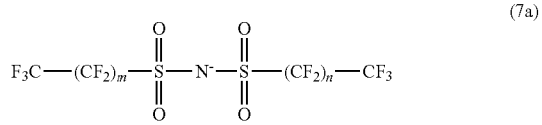

(7a)

wherein in and n are independently 0 or an integer of 1 or above.

24. The method according to claim 22, wherein Y⁻ has the formula:

(7b)

wherein in is 0 or an integer of at least 1.

25. The method according to claim 1, wherein Y⁻ contains at least one carbon-nitrogen unsaturated bond.

26. The method according to claim 25, wherein Y⁻ contains at least one nitrile group.

27. The method according to claim 26, wherein Y⁻ is selected from dicyanamide and tricyanamide anion.

28. The method according to claim 1, wherein said method further includes, before said carbonization step, depositing said ionic liquid onto a substrate.

29. The method according to claim 28, wherein said ionic liquid is deposited as a liquid without admixing said ionic liquid with a solvent.

* * * * *